(12) United States Patent
Tanaka et al.

(10) Patent No.: US 10,550,843 B2
(45) Date of Patent: Feb. 4, 2020

(54) ROTARY COMPRESSOR

(71) Applicant: FUJITSU GENERAL LIMITED, Kanagawa (JP)

(72) Inventors: Junya Tanaka, Kanagawa (JP); Motonobu Furukawa, Kanagawa (JP); Taku Morishita, Kanagawa (JP); Naoya Morozumi, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 177 days.

(21) Appl. No.: 15/542,536

(22) PCT Filed: Nov. 26, 2015

(86) PCT No.: PCT/JP2015/083296
§ 371 (c)(1),
(2) Date: Jul. 10, 2017

(87) PCT Pub. No.: WO2016/114016
PCT Pub. Date: Jul. 21, 2016

(65) Prior Publication Data
US 2018/0023567 A1   Jan. 25, 2018

(30) Foreign Application Priority Data

Jan. 13, 2015 (JP) .................................. 2015-004277
Jan. 15, 2015 (JP) .................................. 2015-006205
(Continued)

(51) Int. Cl.
*F04C 29/12* (2006.01)
*F04C 29/00* (2006.01)
(Continued)

(52) U.S. Cl.
CPC ........ *F04C 18/356* (2013.01); *F01C 21/0881* (2013.01); *F04C 18/07* (2013.01);
(Continued)

(58) Field of Classification Search
CPC .... F04C 18/356; F04C 18/324; F04C 23/008; F04C 29/12; F04C 29/00; F01C 21/088; F25B 1/04
See application file for complete search history.

(56) References Cited

U.S. PATENT DOCUMENTS 6,651,458 B1    11/2003  Ebara et al.
8,206,139 B2 *   6/2012  Hirayama ............. F04C 18/356
                                                    418/11
(Continued)

FOREIGN PATENT DOCUMENTS

CN    101688536 A    3/2010
CN    202273879 U    6/2012
(Continued)

OTHER PUBLICATIONS

Australian Office Action issued in corresponding Australian Patent Application No. 2015377503, dated Aug. 3, 2018.
(Continued)

*Primary Examiner* — Deming Wan
(74) *Attorney, Agent, or Firm* — McDermott Will & Emery LLP

(57) ABSTRACT

A rotary compressor includes a sealed longitudinal compressor housing which is provided with a discharge portion of a refrigerant at an upper portion thereof, is provided with an inlet portion of a refrigerant at a lower portion thereof, and in which lubricant oil is stored; a compressing unit which is disposed in the compressor housing, compresses a refrigerant sucked from the inlet portion and discharges the refrigerant from the discharge portion; a motor which is
(Continued)

disposed in the compressor housing and drives the compressing unit via a rotation shaft; and an accumulator which is attached to a side portion of the compressor housing and is connected to the inlet portion of the refrigerant. When an inner diameter of a cylinder constituting the compressing unit is referred to as Dc, a height of the cylinder is referred to as Hc, and an eccentric amount of an eccentric portion of the rotation shaft is referred to as e, Dc, Hc, and e are set so that a value obtained by an expression $(e+Hc) \cdot (Dc-e)^{1/3} / (e \cdot Hc)^{2/3}$ is less than 4.1.

11 Claims, 16 Drawing Sheets

(30) Foreign Application Priority Data

Jan. 15, 2015 (JP) .................... 2015-006206
Mar. 13, 2015 (JP) .................... 2015-051231

(51) Int. Cl.
*F04C 18/324* (2006.01)
*F04C 18/356* (2006.01)
*F01C 21/08* (2006.01)
*F04C 18/07* (2006.01)
*F04C 29/04* (2006.01)
*F25B 1/04* (2006.01)
*F04C 23/00* (2006.01)
*F25B 13/00* (2006.01)

(52) U.S. Cl.
CPC ........ *F04C 18/324* (2013.01); *F04C 29/0028* (2013.01); *F04C 29/047* (2013.01); *F04C 29/128* (2013.01); *F25B 1/04* (2013.01); *F04C 23/00* (2013.01); *F04C 2210/268* (2013.01); *F15B 2201/3156* (2013.01); *F16C 2360/42* (2013.01); *F25B 13/00* (2013.01); *F25B 2400/23* (2013.01)

(56) References Cited

U.S. PATENT DOCUMENTS

| | | | | |
|---|---|---|---|---|
| 8,517,702 | B2* | 8/2013 | Byun | F01C 21/0863 285/50 |
| 2002/0150493 | A1* | 10/2002 | Matsumoto | C10M 171/008 418/63 |
| 2010/0147020 | A1 | 6/2010 | Hirayama | |
| 2010/0322796 | A1* | 12/2010 | Ko | F04B 39/123 417/415 |
| 2012/0329689 | A1* | 12/2012 | Rebrovic | C09K 5/045 508/273 |
| 2013/0207023 | A1* | 8/2013 | Benanti | C09K 5/045 252/68 |

FOREIGN PATENT DOCUMENTS

| | | |
|---|---|---|
| JP | 57-088283 A | 6/1982 |
| JP | 02-140486 A | 5/1990 |
| JP | H09-071793 A | 3/1997 |
| JP | 2001-183019 A | 7/2001 |
| JP | 2006-077633 A | 3/2006 |
| JP | 2007-092643 A | 4/2007 |
| JP | 2008-196034 A | 8/2008 |
| JP | 2011-251652 A | 12/2011 |
| JP | 2013-096280 A | 5/2013 |
| WO | 2009/028632 A1 | 3/2009 |
| WO | 2013/061606 A1 | 5/2013 |

OTHER PUBLICATIONS

English translation of International Search Report issued in Application No. PCT/JP2015/083296 dated Feb. 23, 2016.

Chinese Office Action issued in corresponding Chinese Patent Application No. 201580072605.4, dated Jun. 4, 2018, with English Translation.

* cited by examiner

[Fig. 1]
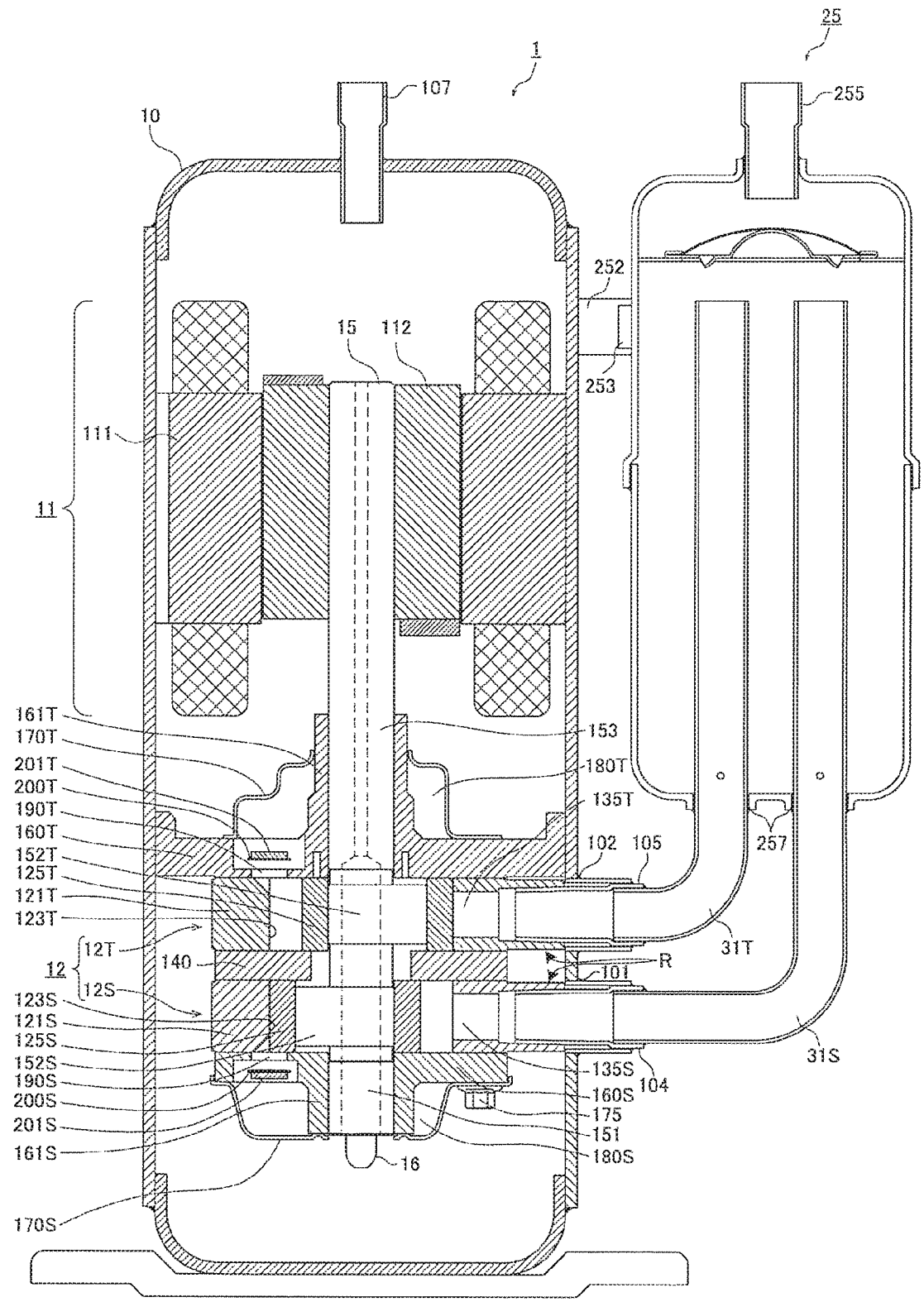

[Fig. 2]
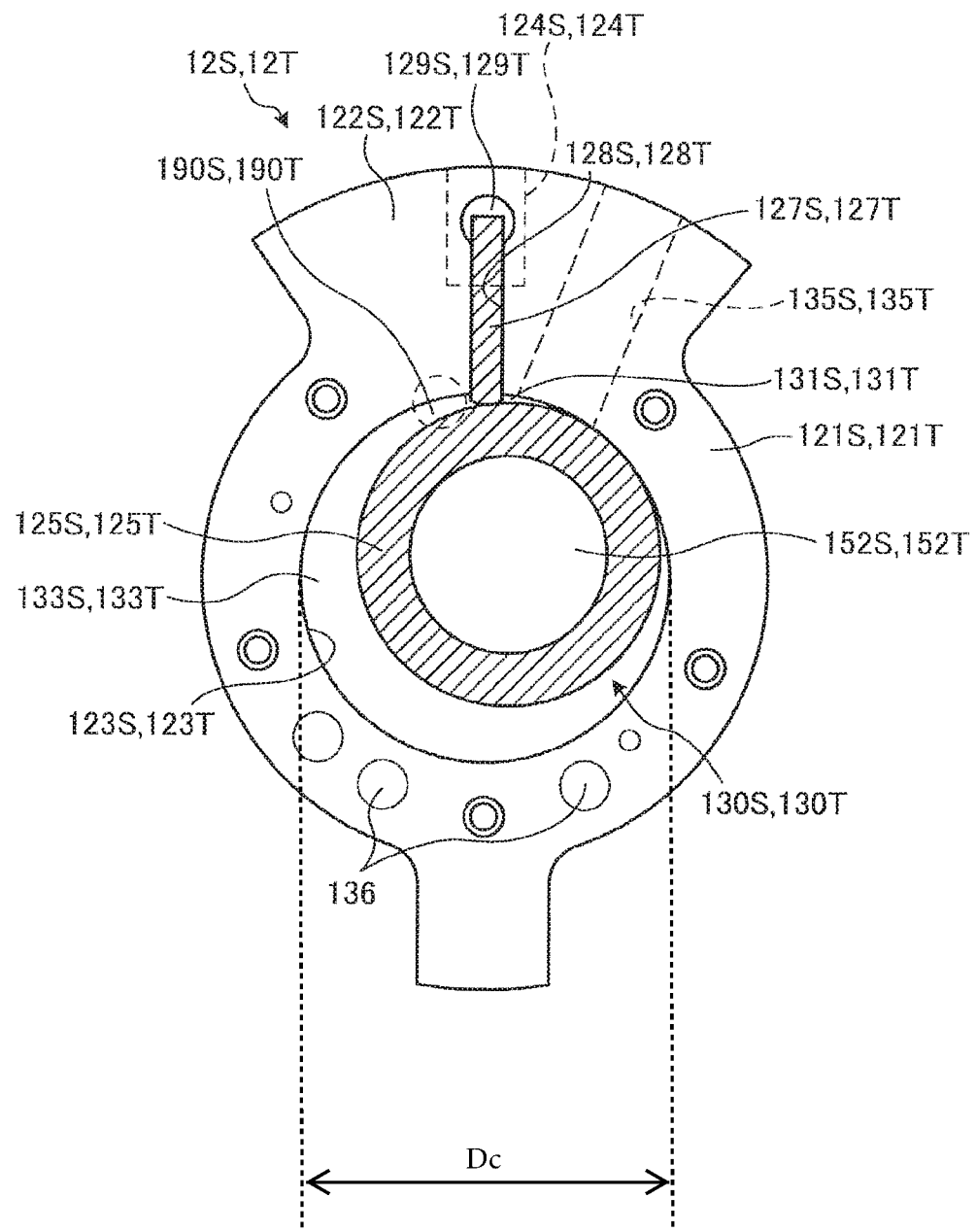

[Fig. 3]
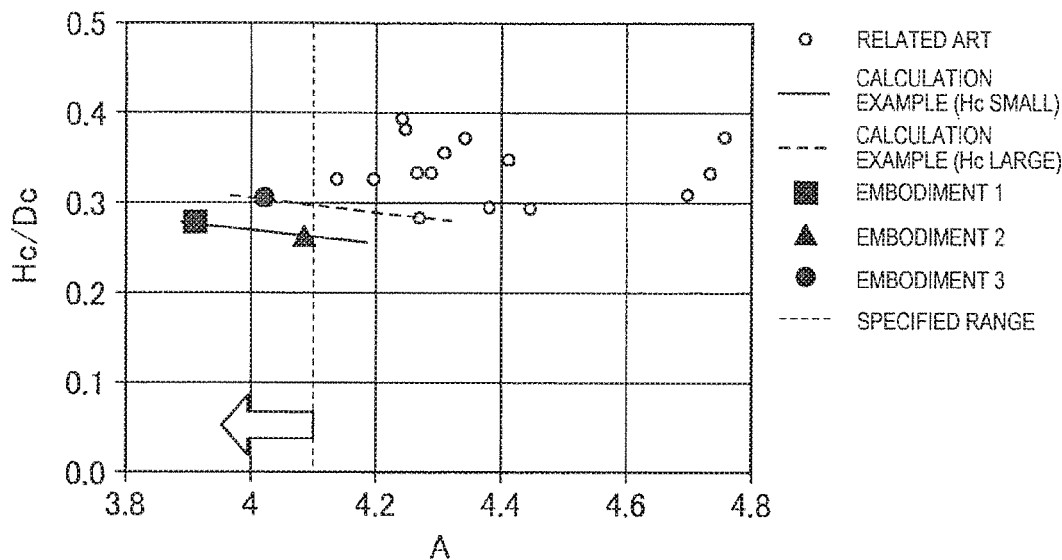
[Fig. 4]
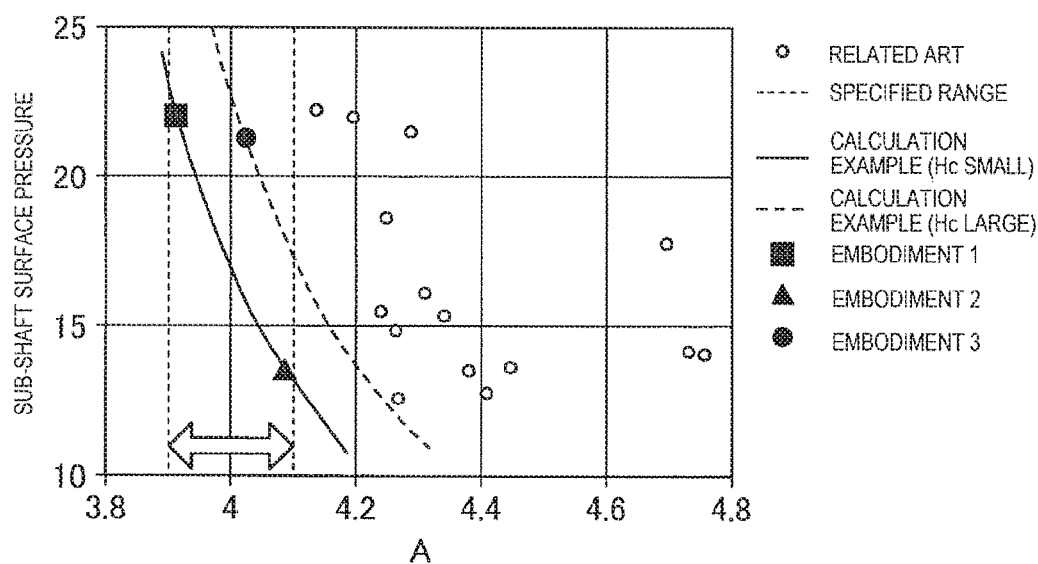

[Fig. 5]
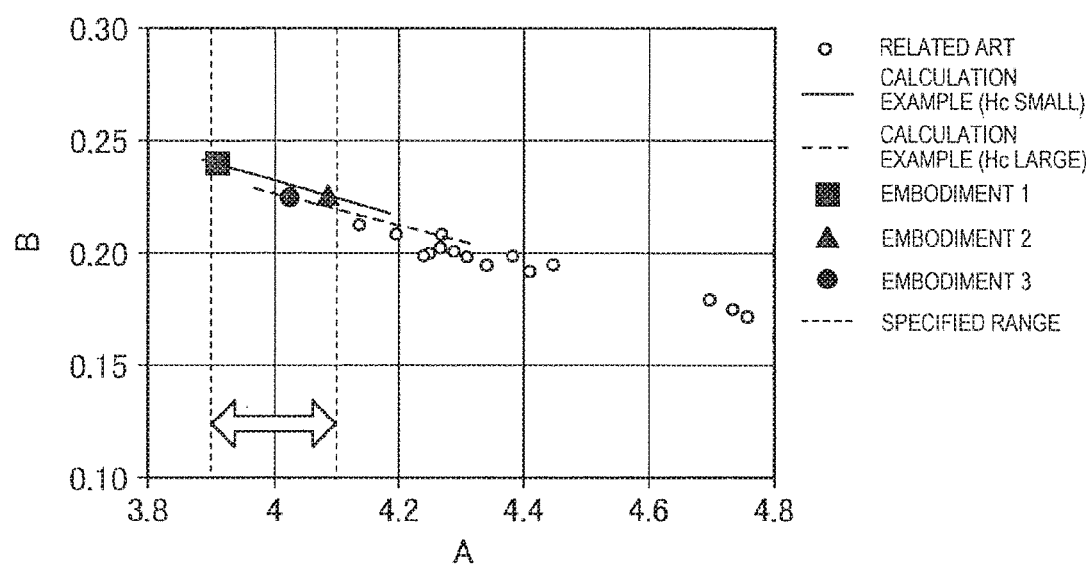

[Fig. 6]

| | CYLINDER HEIGHT Hc[mm] | CYLINDER INNER DIAMETER Dc[mm] | Hc/Dc | ECCENTRIC AMOUNT e [mm] | PARAMETER A | PARAMETER B | SUB-SHAFT DIAMETER [mm] | SUB-SHAFT SURFACE PRESSURE P | INLET HOLE DIAMETER [mm] |
|---|---|---|---|---|---|---|---|---|---|
| EMBODIMENT 1 | 12.4 | 44.8 | 0.28 | 4.64 | 3.91 | 0.240 | 11.9 | 22.0 | 7.5 |
| EMBODIMENT 2 | 12.4 | 46.9 | 0.26 | 4.38 | 4.08 | 0.226 | 15.6 | 13.6 | 7.5 |
| EMBODIMENT 3 | 13.4 | 43.9 | 0.31 | 4.35 | 4.02 | 0.225 | 12.5 | 21.3 | 8.5 |

[Fig. 7]
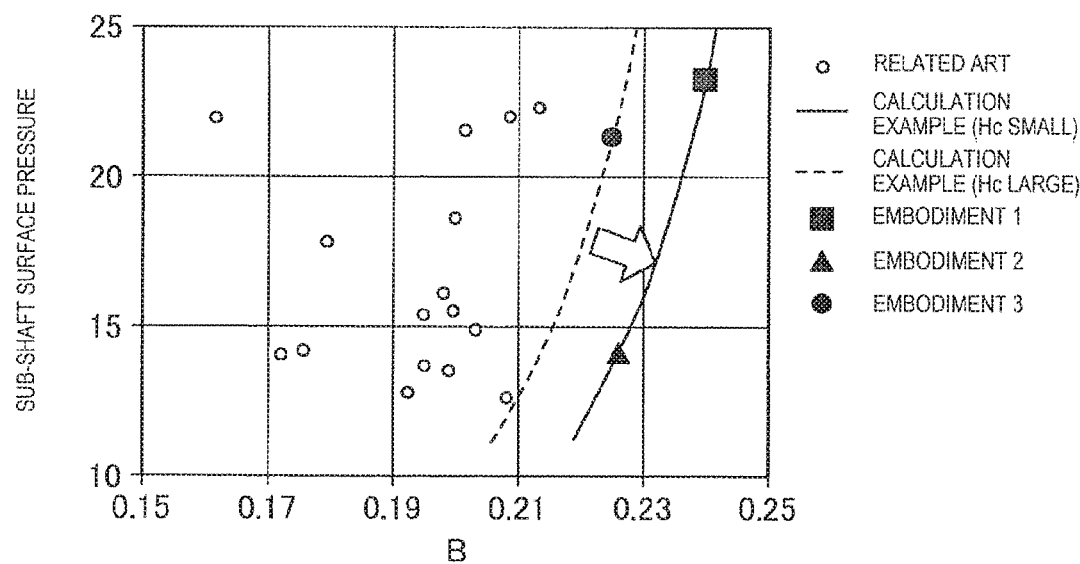
[Fig. 8]
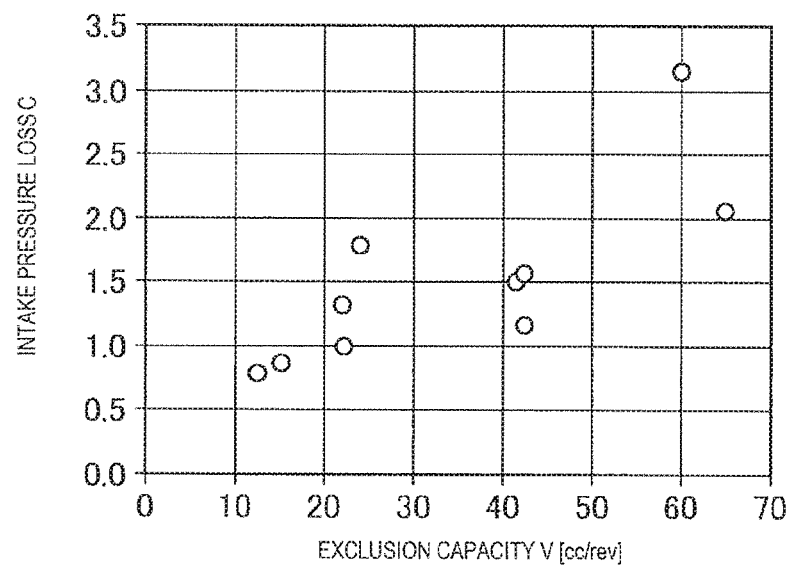

[Fig. 9]

| | CYLINDER HEIGHT Hc[mm] | CYLINDER INNER DIAMETER Dc[mm] | ECCENTRIC AMOUNT e [mm] | PARAMETER A | PARAMETER B | INLET HOLE DIAMETER [mm] | INTAKE PRESSURE LOSS C | |
|---|---|---|---|---|---|---|---|---|
| | | | | | | | R410A | R32 |
| EMBODIMENT 4 | 12.4 | 44.8 | 4.64 | 3.91 | 0.240 | 7.5 | 1.66 | 1.16 |
| EMBODIMENT 5 | 12.4 | 46.9 | 4.38 | 4.08 | 0.226 | 7.5 | 1.66 | 1.16 |
| EMBODIMENT 6 | 13.4 | 43.9 | 4.35 | 4.02 | 0.225 | 8.5 | 1.01 | 0.70 |

[Fig. 10]
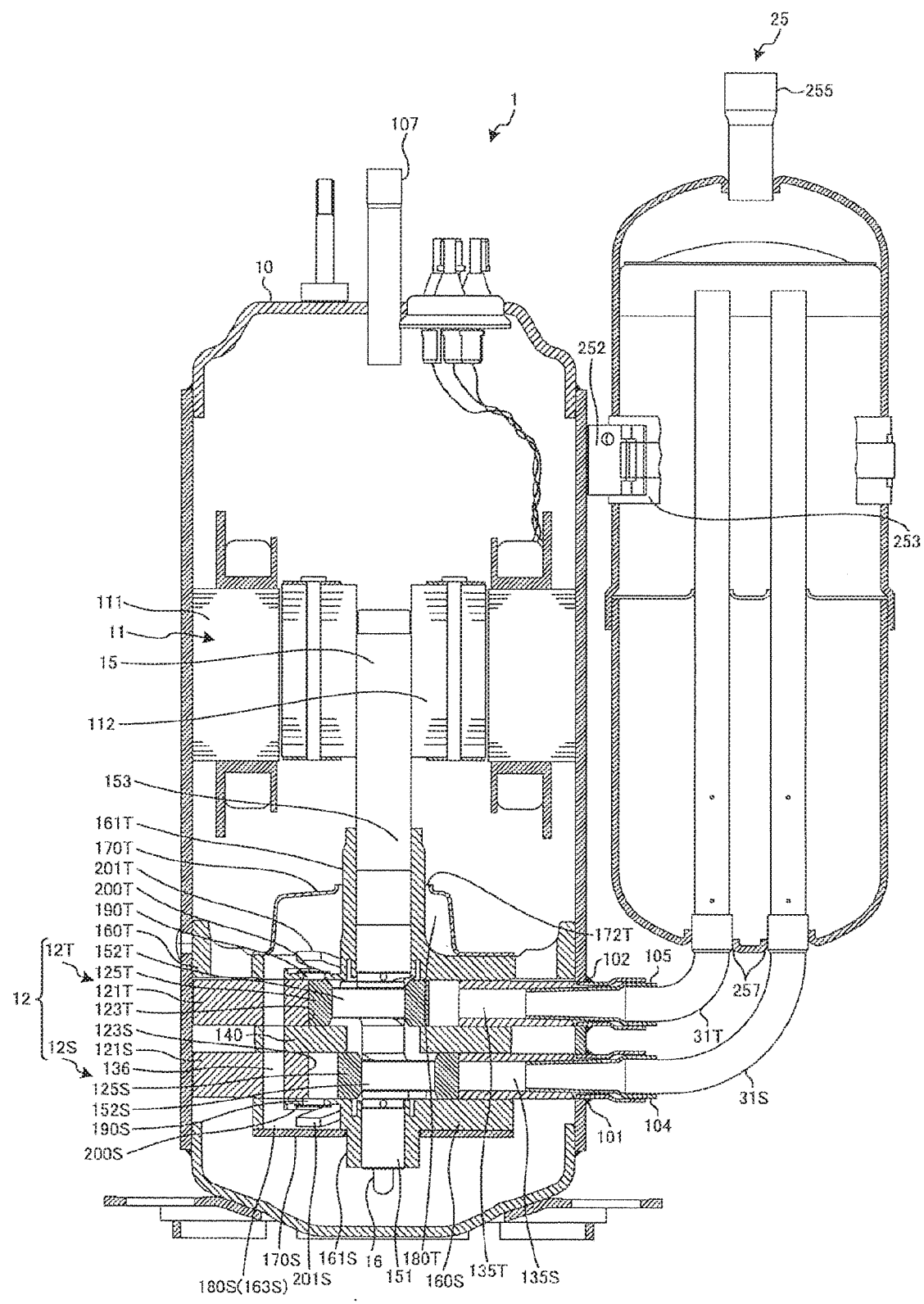

[Fig. 11-1]
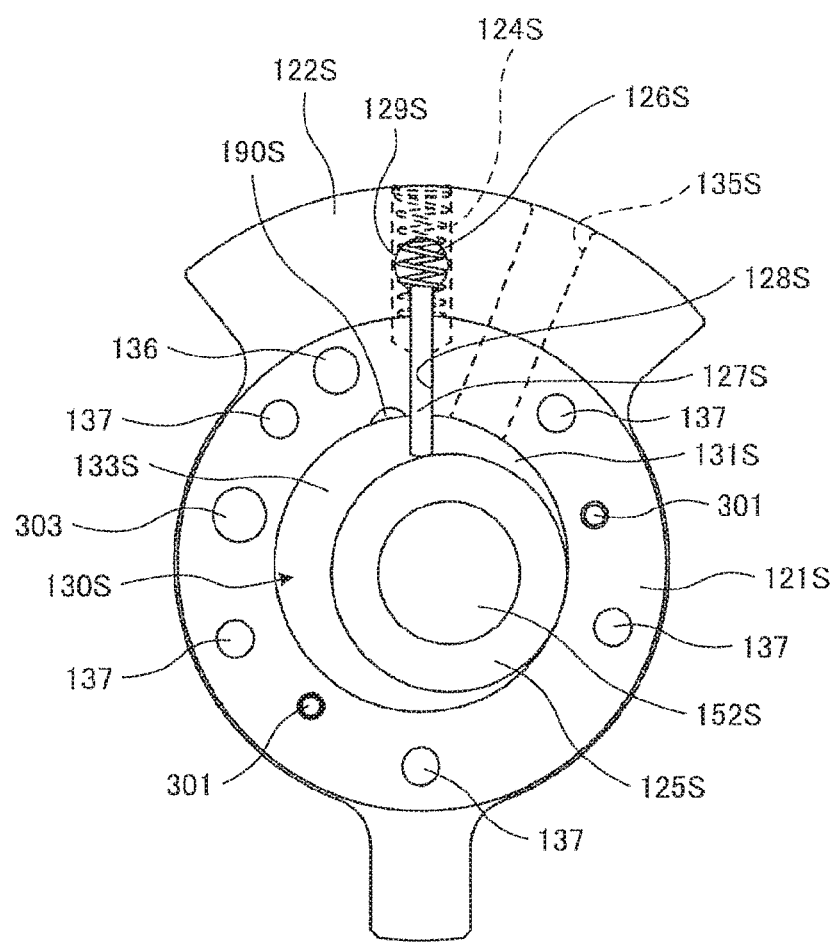

[Fig. 11-2]
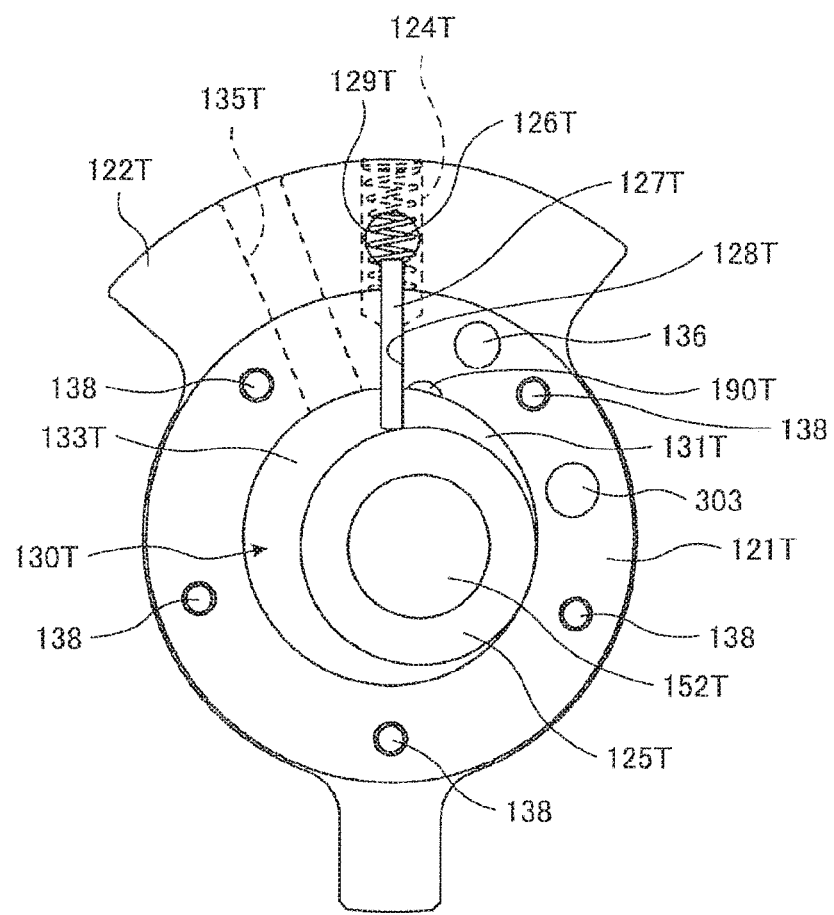

[Fig. 12]
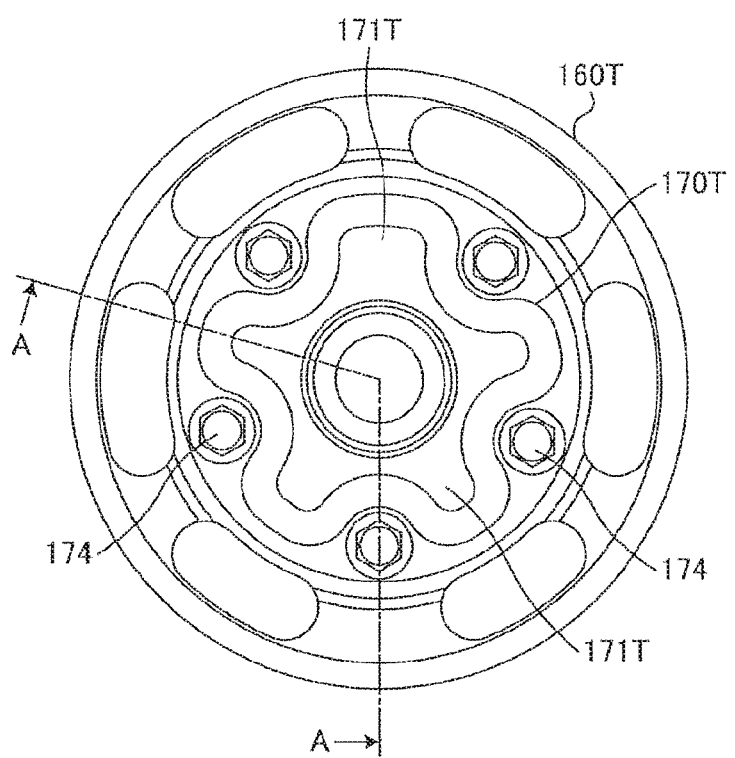

[Fig. 13]
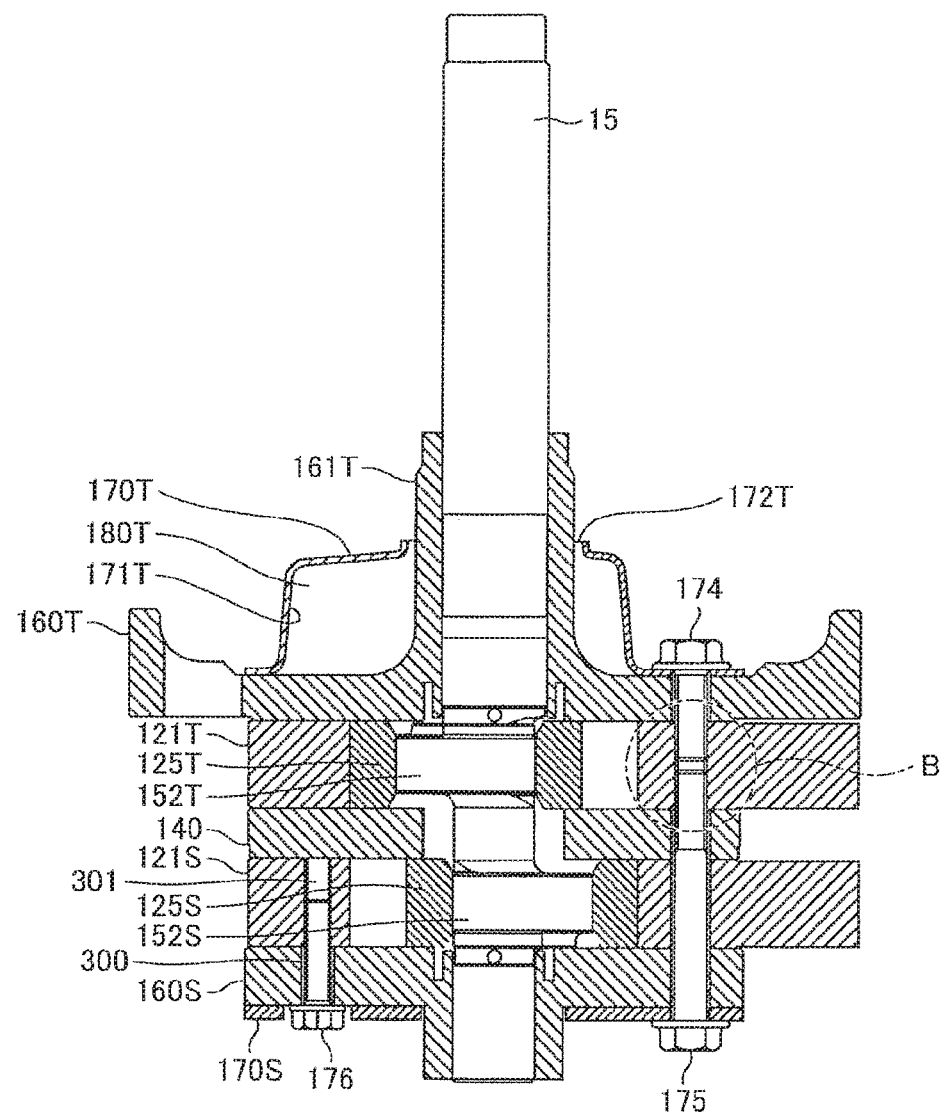

[Fig. 14]
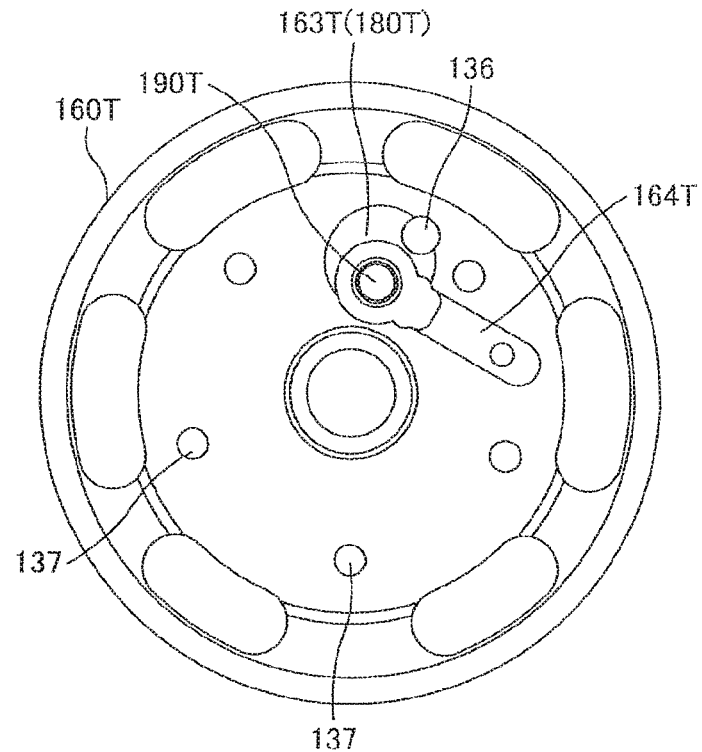
[Fig. 15]
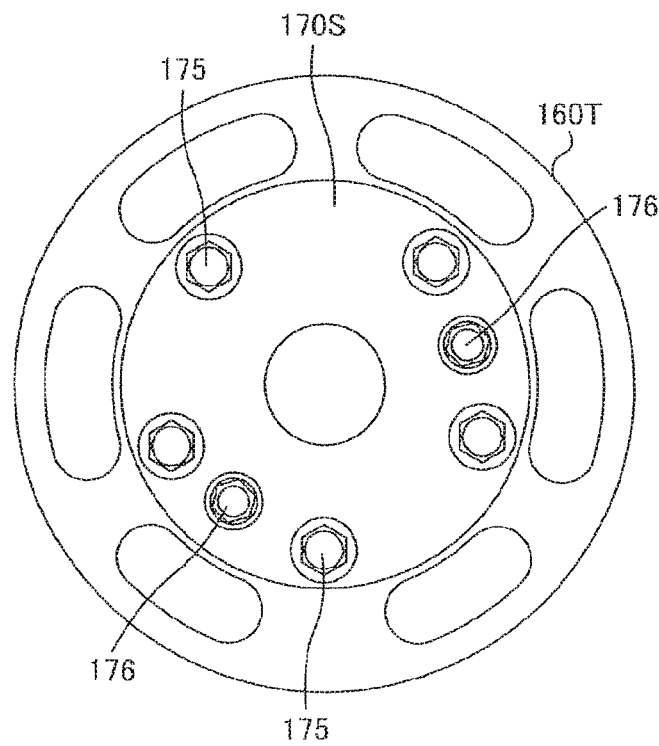

[Fig. 16]
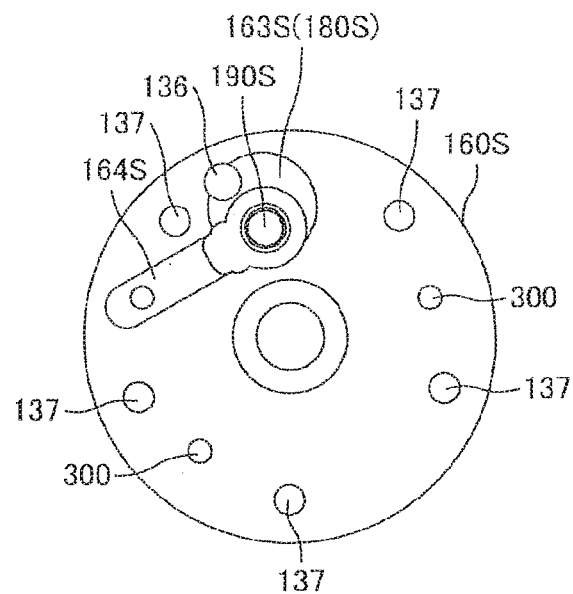
[Fig. 17]
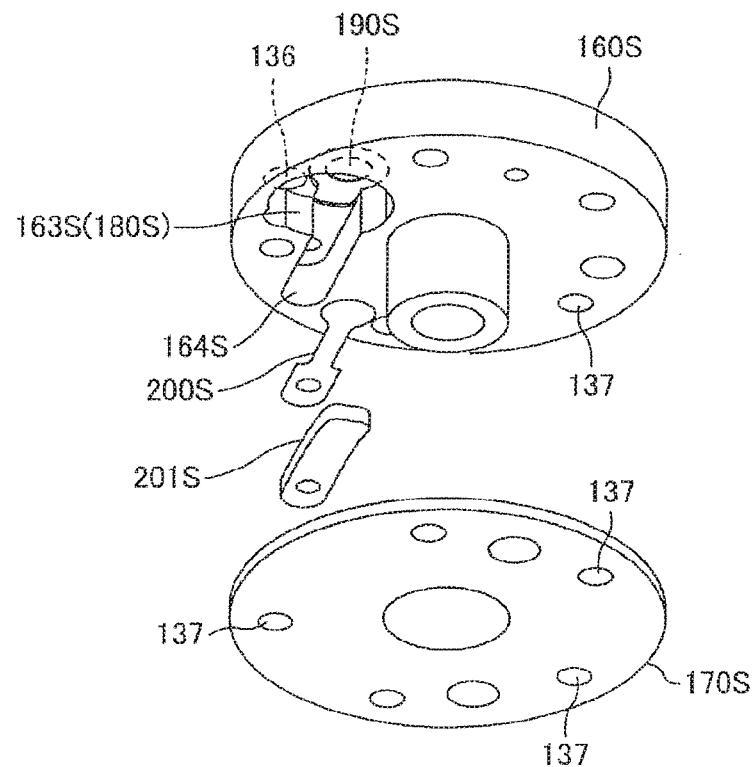

[Fig. 18]
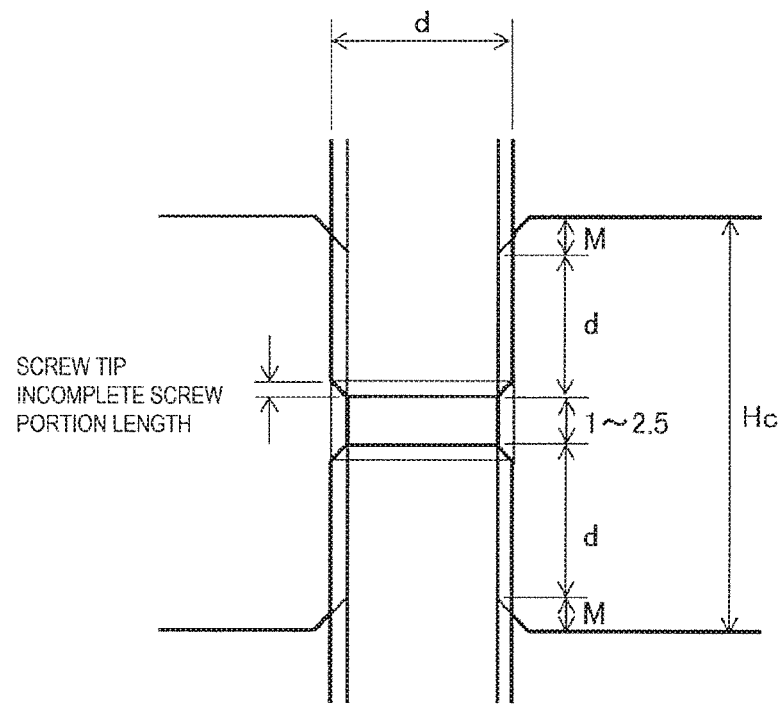

[Fig. 19]

| | CYLINDER HEIGHT Hc[mm] | CYLINDER INNER DIAMETER Dc[mm] | ECCENTRIC AMOUNT e [mm] | PARAMETER A | PARAMETER B | FIXING BOLT NOMINAL DIAMETER d[mm] | FEMALE SCREW CHAMFER M[mm] | 2×(d+M) +1.0 | 2×(d+M) +2.6 |
|---|---|---|---|---|---|---|---|---|---|
| EMBODIMENT 7 | 12.4 | 44.8 | 4.64 | 3.91 | 0.240 | 5.0 | 0.5 | 12.0 | 13.5 |
| EMBODIMENT 8 | 12.4 | 46.9 | 4.38 | 4.08 | 0.226 | 5.0 | 0.5 | 12.0 | 13.5 |
| EMBODIMENT 9 | 13.4 | 43.9 | 4.35 | 4.02 | 0.225 | 5.0 | 0.5 | 12.0 | 13.5 |

ROTARY COMPRESSOR

RELATED APPLICATIONS

This application is the U.S. National Phase under 35 § 371 of International Application No. PCT/JP2015/083296, filed on Nov. 26, 2015, which in turn claims the benefit of Japanese Application No. 2015-004277, filed Jan. 13, 2015, Japanese Application No. 2015-006205, filed Jan. 15, 2015, Japanese Application No. 2015-006206, filed Jan. 15, 2015, and Japanese Application No. 2015-051231, filed on Mar. 13, 2015, the disclosures of which are incorporated by reference herein.

TECHNICAL FIELD

The present invention relates to a rotary compressor used for an air conditioner, a refrigerating machine, or the like.

BACKGROUND ART

In the rotary compressor, heat is transferred from a cylinder and an end plate having a high temperature to a refrigerant, the refrigerant thermally expands, the compression power is increased, and thus the compressor efficiency is decreased in an intake process of a compressing unit.

For example, PTL 1 discloses a rotary compressor in which a piston for being eccentrically rotated by a crankshaft (eccentric portion) pivotally supported by end plates closing both ends of a cylinder is disposed in a compression chamber (cylinder chamber) surrounded by the cylinder and the end plates, a compressing unit in which a vane being in contact with an outer circumferential surface of the piston and dividing the compression chamber into a high pressure side and a low pressure side is attached to the cylinder and a motor which drives the compressing unit are accommodated in a sealed container, a hole which passes through the cylinder in an axial direction is provided in an inlet side portion of the cylinder, a sealed space is formed by both end surfaces of the hole being closed by the end plates, and heat transfer from a refrigerant in the sealed container having a high temperature at the time of operation to a cylinder inner wall is suppressed by the sealed space and temperature rise of a refrigerant in the cylinder is suppressed.

CITATION LIST

Patent Literature

PTL 1: JP-A-02-140486

SUMMARY OF INVENTION

Technical Problem

However, in a rotary compressor described in PTL 1, there is a problem that since a hole which passes through a cylinder in the axial direction is provided in an inlet side portion of the cylinder, the cost is increased.

An object of the present invention is to provide a rotary compressor which suppresses heat transfer from a cylinder and an end plate to a refrigerant in a compressing unit and in which an increase in cost is suppressed.

Solution to Problem

According to an aspect of the invention, there is provided a rotary compressor including: a sealed longitudinal compressor housing which is provided with a discharge portion of a refrigerant at an upper portion thereof, is provided with an inlet portion of a refrigerant at a lower portion thereof, and in which lubricant oil is stored; a compressing unit which is disposed in the compressor housing, compresses a refrigerant sucked from the inlet portion and discharges the refrigerant from the discharge portion; a motor which is disposed in the compressor housing and drives the compressing unit via a rotation shaft; and an accumulator which is attached to a side portion of the compressor housing and is connected to the inlet portion of the refrigerant. When an inner diameter of a cylinder constituting the compressing unit is referred to as Dc, a height of the cylinder is referred to as Hc, and an eccentric amount of an eccentric portion of the rotation shaft is referred to as e, Dc, Hc, and e are set so that a value obtained by an expression $(e+Hc) \cdot Dc-e)^{1/3}/(e \cdot Hc)^{2/3}$ is less than 4.1.

Advantageous Effects of Invention

In the invention, by appropriately setting the size of the compressing unit without providing a hole or the like which passes through the cylinder in the axial direction, the heat transfer from the cylinder and the end plate to a refrigerant in the compressing unit can be suppressed and an increase in cost can be suppressed.

BRIEF DESCRIPTION OF DRAWINGS

FIG. 1 is a longitudinal sectional view illustrating an example of a rotary compressor according to the invention.

FIG. 2 is a lateral sectional view of a first compressing unit and a second compressing unit as viewed from above.

FIG. 3 is a diagram illustrating a relationship between parameter A which is a function of cylinder chamber wall surface area S/cylinder chamber capacity V and cylinder height Hc/cylinder inner diameter Dc.

FIG. 4 is a diagram illustrating a relationship between parameter A and a sub-shaft surface pressure.

FIG. 5 is a diagram illustrating a relationship between parameter A and parameter B which is a function of an eccentric amount e of an eccentric portion/cylinder chamber capacity V.

FIG. 6 is a table illustrating Embodiments 1 to 3 of a size of a compressing unit of a two-cylinder type of rotary compressor using a refrigerant R32.

FIG. 7 is a diagram illustrating a relationship between parameter B and a sub-shaft unit surface pressure.

FIG. 8 is a diagram illustrating a relationship between an exclusion capacity V and an intake pressure loss C (parameter C) of a rotary compressor for a refrigerant R410A.

FIG. 9 is a table illustrating Embodiments 4 to 6 of the size: of a compressing unit of a two-cylinder type of rotary compressor using a refrigerant 132.

FIG. 10 is a longitudinal sectional view illustrating another example of the rotary compressor according to the invention.

FIG. 11-1 is a bottom view illustrating a first compressing unit of another example.

FIG. 11-2 is a top view illustrating a second compressing unit of another example.

FIG. 12 is a top view illustrating a compressing unit of another example.

FIG. 13 is a longitudinal sectional view taken along the line A-A of FIG. 12.

FIG. 14 is a top view illustrating an upper end plate of another example.

FIG. 15 is a bottom view illustrating a compressing unit of another example.

FIG. 16 is a bottom view illustrating a lower end plate of another example.

FIG. 17 is an exploded perspective view illustrating a lower end plate and a lower end plate cover of another example.

FIG. 18 is an enlarged view of B portion in FIG. 13.

FIG. 19 is a table illustrating Embodiments 7 to 9 of the size of the compressing unit of a two-cylinder type of rotary compressor using a refrigerant R32.

DESCRIPTION OF EMBODIMENTS

Hereinafter, aspects (example, for carrying out the invention will be described in detail with reference to the drawings.

Example 1

FIG. 1 is a longitudinal sectional view illustrating an example of a rotary compressor according to the invention and FIG. 2 is a lateral sectional view of a first compressing unit and a second compressing unit of the example as viewed from above.

As illustrated in FIG. 1, a rotary compressor 1 includes a compressing unit 12 which is disposed in a lower portion of a sealed vertically-placed cylindrical compressor housing 10, and a motor 11 which is disposed in an upper portion of the compressor housing 10 and drives the compressing unit 12 via a rotation shaft 15.

A stator 111 of the motor 11 is formed in a cylindrical shape and is fixed by shrinkage fitting to an inner circumferential surface of the compressor housing 10. A rotor 112 of the motor 11 is disposed in an inside portion of the cylindrical stator 111 and is fixed by shrinkage fitting to the rotation shaft 15 which mechanically connects the motor 11 and the compressing unit 12 to each other.

The compressing unit 12 includes a first compressing unit 12S and a second compressing unit 12T, and the second compressing unit 12T is disposed above the first compressing unit 120. As illustrated in FIG. 2, the first compressing unit 120 includes an annular first cylinder 121S. The first cylinder 121S includes a first side-flared portion 122S extending from an annular outer circumference thereof, and a first inlet hole 135S and a first vane groove 128S are radially provided in the first side-flared portion 122S. In addition, the second compressing unit 12T includes an annular second cylinder 121T. The second cylinder 121T includes a second side-flared portion 122T extending from an annular outer circumference thereof and a second inlet hole 135T and a second vane groove 128T are radially provided in the second side-flared portion 122T.

As illustrated in FIG. 2, a circular first cylinder inner wall 123S is formed concentrically with the rotation shaft 15 of the motor 11 in the first cylinder 121S. A first annular piston 125S having an outer diameter smaller than an inner diameter of the first cylinder 121S is disposed in the first cylinder inner wall 123S and a first cylinder chamber 130S which sucks, compresses and discharges a refrigerant is formed between the first cylinder inner wall 123S and the first annular piston 125S. A circular second cylinder inner wall 123T is formed concentrically with the rotation shaft 15 of the motor 11 in the second cylinder 121T. A second annular piston 125T having an outer diameter smaller than an inner diameter of the second cylinder 121T is disposed in the second cylinder inner wall 123T and a second cylinder chamber 130T which sucks, compresses and discharges a refrigerant is formed between the second cylinder inner wall 123T and the second annular piston 125T.

The first vane groove 128S extending in the radial direction from the first cylinder inner wall 123S over the entire cylinder height is formed in the first cylinder 121S and a flat plate-shaped first vane 127S is slidably fitted into the first vane groove 128S. The second vane groove 128T extending in the radial direction from the second cylinder inner wall 123T over the entire cylinder height is formed in the second cylinder 121T and a plate-shaped second vane 127T is slidably fitted into the second vane groove 128T.

As illustrated in FIG. 2, a first spring hole 124S is formed on an outer side of the first vane groove 128S in the radial direction so as to communicate with the first vane groove 128S from an outer circumferential portion of the first side-flared portion 122S. A first vane ring (not illustrated) which presses a back surface of the first vane 127S is inserted into the first spring hole 124S. A second spring hole 124T is formed on an outer side of the second vane groove 128T in the radial direction so as to communicate with the second vane groove 128T from an outer circumferential portion of the second side-flared portion 122T. A second vane spring (not illustrated) which presses a back surface of the second vane 127T is inserted into the second spring hole 124T.

When the rotary compressor 1 is started up, the first vane 127S protrudes into the first cylinder chamber 130S from an inside of the first vane groove 128S into the first cylinder chamber 130S by repulsive force of the first vane spring, a tip thereof is in contact with the outer circumferential surface of the first annular piston 125S, and the first vane 127S divides the first cylinder chamber 130S into a first inlet chamber 131S and a first compression chamber 133S. In addition, similarly the second vane 127T protrudes from an inside of the second vane groove 128T into the second cylinder chamber 130T by repulsive force of the second vane spring, the tip thereof is in contact with an the outer circumferential surface of the second annular piston 125T, and the second vane 127T divides the second cylinder chamber 1301 into a second inlet chamber 131T and a second compression chamber 133T.

In addition, a first pressure guiding-in path 129S which communicates an outside of the first vane groove 123S in the radial direction and an inside of the compressor housing 10 by an opening portion R (see FIG. 1), in which the compressed refrigerant in the compressor housing 10 is introduced, and which applies a back pressure by a pressure of the refrigerant to the first vane 1270 is formed in the first cylinder 121S. The compressed refrigerant in the compressor housing 10 is also introduced from the first spring hole 124S. In addition, a second pressure guiding-in path 129T which communicates an outside of the second vane groove 128T in the radial direction and an inside of the compressor housing 10 by the opening portion R (see FIG. 1), in which the compressed refrigerant in the compressor housing 10 is introduced, and which applies a back pressure by the pressure of the refrigerant to the second vane 127T is formed in the second cylinder 121T. The compressed refrigerant in the compressor housing 10 is also introduced from the second spring hole 124T.

A first inlet hole 135S which communicates the first inlet chamber 131S and the outside portion with each other is provided in the first side-flared portion 122S of the first cylinder 121S so as to suck a refrigerant from the outside portion into the first inlet chamber 131S. A second inlet hole 135T which communicates the second inlet chamber 131T and the outside portion with each other is provided in the second side-flared portion 122T of the second cylinder 121T so as to suck a refrigerant from the outside portion into the second inlet chamber 131T. The cross sections of the first inlet hole 135S and the second inlet hole 135T are circular.

In addition, as illustrated in FIG. 1, a intermediate partition plate 140 is disposed between the first cylinder 121S and the second cylinder 121T and partitions between the first cylinder chamber 130S (see FIG. 2) of the first cylinder 121S and the second cylinder chamber 130T (see FIG. 2) of the second cylinder 121T. The intermediate partition plate 140 closes an upper end portion of the first cylinder 121S and a lower end portion of the second cylinder 121T.

A lower end plate 160S is disposed at the lower end portion of the first cylinder 121S and closes the first cylinder chamber 130S of the first cylinder 121S. In addition, an upper end plate 160T is disposed at the upper end portion, of the second cylinder 121T and closes the second cylinder chamber 130T of the second cylinder 121T. The lower end plate 160S closes the lower end portion of the first cylinder 121S and the upper end plate 160T closes the upper end portion of the second cylinder 121T.

A sub-bearing unit 161S is formed on the lower end plate 160S and a sub-shaft unit 151 of the rotation shaft 15 is rotatably supported by the sub-bearing unit 161S. A main bearing unit 161T is formed on the upper end plate 160T and a main shaft unit 153 of the rotation shaft 15 is rotatably supported by the main bearing unit 161T.

The rotation shaft 15 includes a first eccentric portion 152S and a second eccentric portion 152T which are eccentrically shifted by 180° phase from each other, the first eccentric portion 152S is rotatably fitted to the first annular piston 125S of the first compressing unit 12S, and the second eccentric portion 152T is rotatably fitted to the second annular piston 125T of the second compressing unit 12T.

When the rotation shaft 15 rotates, the first annular piston 125S revolves clockwise in FIG. 2 along the first cylinder inner wall 123S in the first cylinder 121S and the first vane 127S reciprocates following the first annular piston 125S. Due to the movement of the first annular piston 125S and the first vane 127S, the capacities of the first inlet chamber 131S and the first compression chamber 133S are continuously changed, and the compressing unit 12 continuously sucks, compresses and discharges a refrigerant. In addition, when the rotation shaft 15 rotates, the second annular piston 125T revolves clockwise in FIG. 2 along the second cylinder inner wall 123T in the second cylinder 121T and the second vane 127T reciprocates following the second annular piston 125T. Due to the movement of the second annular piston 125T and the second vane 127T, the capacities of the second inlet chamber 131T and the second compression chamber 133T are continuously changed, and the compressing unit 12 continuously sucks, compresses and discharges a refrigerant.

As illustrated in FIG. 1, a lower end plate cover 170S is disposed under the lower end plate 160S and a lower muffler chamber 180S is formed between the lower end plate 160S and the lower end plate cover 170S. The first compressing unit 12S opens into the lower muffler chamber 180S. In other words, a first discharge hole 190S (see FIG. 2) communicating the first compression chamber 133S of the first cylinder 121S and the lower muffler chamber 180S with each other is provided in the vicinity of the first vane 127S of the lower end plate 160S and a reed valve type of first discharge valve 200S for preventing back-flow of the compressed refrigerant is disposed in the first discharge hole 190S.

The lower muffler chamber 180S is one annularly formed chamber, and is a portion of a communication path which communicates a discharge side of the first compressing unit 12S and an inside of an upper muffler chamber 180T with each other through a refrigerant path hole 136 (see FIG. 2) which passes through the lower end plate 160S, the first cylinder 121S, the intermediate partition plate 140, the second cylinder 121T, and the upper end plate 160T. The lower muffler chamber 180S reduces pressure pulsation of the discharged refrigerant. In addition, a first discharge valve cap 201S for limiting the flexural valve opening amount of the first discharge valve 200S, which overlaps the first discharge valve 200S, is fixed together with the first discharge valve 200S by rivets. The first discharge hole 190S, the first discharge valve 200S, and the first discharge valve cap 201S constitute a first discharge valve unit of the lower end plate 160S.

As illustrated in FIG. 1, an upper end plate cover 170T is disposed above the upper end plate 160T and the upper muffler chamber 180T is formed between the upper end plate 160T and the upper end plate cover 170T. A second discharge hole 190T (see FIG. 2) communicating the second compression chamber 133T of the second cylinder 121T and the upper muffler chamber 180T with each other is provided in the vicinity of the second vane 127T of the upper end plate 160T, and a reed valve type of second discharge valve 200T for preventing back-flow of the compressed refrigerant is disposed in the second discharge hole 190T. In addition, a second discharge valve cap 201T for limiting the flexural valve opening amount of the second discharge valve 200T, which overlaps the second discharge valve 200T, is fixed together with the second discharge valve 200T by rivets. The upper muffler chamber 180T reduces pressure pulsation of the discharged refrigerant. The second discharge hole 190T, the second discharge valve 200T, and the second discharge valve cap 201T constitute a second discharge valve unit of the upper end plate 160T.

The lower endplate cover 170S, the lower end plate 160S, the first cylinder 121S and the intermediate partition plate 140 are inserted from the lower side and are fastened to the second cylinder 121T by a plurality of penetrating bolts 175 screwed into female screws provided in the second cylinder 121T The upper end plate cover 1701 and the upper end plate 160T are inserted from the upper side and fastened to the second cylinder 121T by a penetrating bolt illustrated) screwed into the female screws provided in the second cylinder 121T. The lower end plate cover 170S, the lower end plate 160S, the first cylinder 121S, the intermediate partition plate 140, the second cylinder 121T, the upper end plate 160T, and the upper end plate cover 170T integrally fastened by the plurality of penetrating bolts 175 or the like constitute the compressing unit 12. An outer circumferential portion of the upper end plate 160T of the compressing unit 12 is fixed to the compressor housing 10 by spot welding and thus the compressing unit 12 is fixed to the compressor housing 10.

A first through hole 101 and a second through hole 102 are spaced apart from each other in the axial direction and sequentially provided on the outer circumferential wall of the cylindrical compressor housing 10 from the lower portion thereof so as to make a first inlet pipe 104 and a second inlet pipe 105 pass through the holes respectively. In addition, an accumulator 25 formed of an independent cylindrical sealed container is held by an accumulator holder 252 and an accumulator band 253 on an outside portion of the compressor housing 10.

A system connecting pipe 255 which is connected to an evaporator of a refrigerant circuit is connected to a center of a top portion of the accumulator 25 and a first low-pressure communication tube 31S and a second low-pressure communication tube 31T of which one end extends to an upper side of an inside portion of the accumulator 25 and of which the other end is connected to the other end of each the first inlet pipe 104 and the second inlet pipe 105 are fixed to a bottom through hole 257 provided to a bottom portion of the accumulator 25.

The first low-pressure communication tube 3 which guides a low-pressure refrigerant of the refrigerant circuit to the first compressing unit 12S via the accumulator 25 is connected to the first inlet hole 135S (See FIG. 2) of the first cylinder 121S via the first inlet pipe 104 as an inlet portion. In addition, The second low-pressure communication tube 31T which guides the low-pressure refrigerant of the refrigerant circuit to the second compressing unit 121 via the accumulator 25 is connected to the second inlet hole 135T (See FIG. 2) of the second cylinder 121T via the second inlet pipe 105 as an inlet portion. In other words, the first inlet hole 135S and the second inlet hole 135T are connected in parallel to the evaporator of the refrigerant circuit.

A discharge pipe 107 as a discharge portion, which is connected to the refrigerant circuit and discharges a high-pressure refrigerant to a condenser side of the refrigerant circuit, is connected to a top portion of the compressor housing 10. In other words, the first discharge hole 190S and the second discharge hole 190T are connected to a condenser of the refrigerant circuit.

Lubricant oil is enclosed to approximately the height of the second cylinder 121T in the compressor housing 10. In addition, the lubricant oil is sucked up from an oil feeding pipe 16 attached to the lower end portion of the rotation shaft 15 by a pump impeller (not illustrated) inserted into a lower portion of the rotation shaft 15, circulates through the compressing unit 12, lubrication of the sliding component (first annular piston 125S and second annular piston 125T) is performed and minute gaps of the compressing unit 12 are sealed.

Next, with reference to FIG. 1 to FIG. 6, a characteristic configuration of the rotary compressor 1 of the example using a refrigerant R32 will be described. The temperature increase $\Delta t$ [K] of the intake refrigerant in the first cylinder chamber 130S and the second cylinder chamber 130T is expressed by the following expression (1).

$$\Delta t = h \cdot S \cdot \Delta\theta / (m \cdot c) \quad (1)$$

where,
h: heat transfer coefficient [W/(mm$^2$·K)]
S: wall surface area of cylinder chamber (130S and 130T) [mm$^2$]
$\Delta\theta$: difference between wall surface temperature and refrigerant temperature [K]
m: refrigerant mass [g/s]=(cylinder chamber capacity V [mm$^3$/rev])×(intake refrigerant density $\rho$ [g/mm$^3$])
c: refrigerant specific heat [J/(g·K)]

The intake refrigerant density $\rho$ of the refrigerant R32 is about 70% of a refrigerant R410A and the evaporation enthalpy is about 140%. Therefore, substantially, the same exclusion capacity V (cylinder chamber capacity) can be applied. Since the exclusion capacities V are equal to each other, the size of the compressing unit 12 for the refrigerant R410A can be used and the wall surface areas S are also the same. Therefore, $\Delta t$ in the above expression (1) is increased for the refrigerant R32 having a smaller intake refrigerant density $\rho$ than for the refrigerant R410A and the refrigerant R32 is likely to be heated compared to the refrigerant R410A. From this, in a case where the refrigerant R32 is adopted, suppression of refrigerant heating is effective for improving compression efficiency compared to a case where refrigerant R410A is used.

In the invention, when the wall surface area of the cylinder chamber (130S and 130T) is referred to as and the exclusion capacity (cylinder chamber capacity) is referred to as V, the refrigerant heating is suppressed by the sizes of the compressing units 12S and 12T being set so that S/V is decreased.

The wall surface area S of one cylinder chamber (first cylinder chamber 130S or second cylinder chamber 130T) of the rotary compressor 1 of the example is expressed by the following expressions (2) to (5).

$$S = 2Sb + Sc + Sr \quad (2)$$

$$Sb = (Dc^2 - (Dc - 2e)^2)\pi/4 \quad (3)$$

$$Sc = \pi \cdot Dc \cdot Hc \quad (4)$$

$$Sr = \pi \cdot (Dc - 2e) \cdot Hc \quad (5)$$

where,
Sb: area of the end plate (160S and 160T) portion or the intermediate partition plate (140) portion of the cylinder chamber [mm$^2$]
Sc: inner (121S and 121T) inner circumferential wall area [mm$^2$]
Sr: annular piston (125S and 125T) outer circumferential wall area [mm$^2$]
Dc: cylinder (121S and 121T) inner diameter [mm]
e: eccentric portion (152S and 152T) eccentric amount [mm]
Hc: cylinder (121S and 121T) height [mm]

In addition, the exclusion capacity (cylinder chamber capacity) V of one cylinder chamber (first cylinder chamber 130S or second cylinder chamber 130T) of the rotary compressor 1 is expressed by the following expression (6).

$$V = \pi \cdot e \cdot (Dc - e) \cdot Hc \quad (6)$$

From expressions (2) and (6), S/V is expressed by the following expression (7).

$$S/V = 2(e + Hc)/(e \cdot Hc) \quad (7)$$

Since as the exclusion capacity V is increased, S/V is decreased, in order to evaluate the size of the cylinder chamber, it is necessary to eliminate the influence of the exclusion capacity V. Therefore, let S/V multiplied by V$^{1/3}$ be referred to as parameter A [dimensionless]. Parameter A is expressed by the following expression. (8), and as parameter A is decreased, the influence of the refrigerant heating is decreased.

$$A = (e + He) \cdot (Dc - e)^{1/3} / (e \cdot Hc)^{2/3} \quad (8)$$

Next, in Japanese Patent No. 4864572, it is described that the compression efficiency is improved by reducing the refrigerant leak amount by decreasing the ratio Hc/Dc of the cylinder height He and the cylinder inner diameter Dc.

FIG. 3 is a diagram illustrating relationship between parameter A and Hc/Dc. As illustrated in FIG. 3, as parameter A is decreased, Hc/Dc tends to be increased. In Examples 1 to 3 illustrated in FIG. 3, the exclusion capacity V, the inner diameter of the compressor housing 10 and the cylinder height. Hc of the rotary compressor 1 are the same, and the eccentric portion eccentric amount e is changed. Calculation is made for two patterns with cylinder height Hc large and cylinder height Hc small.

In the calculation example (Hc large), the cross-sectional areas of the inlet holes 135S and 135T are set to the cylinder height Hc which can be commonly secured in the related art. As the eccentric portion eccentric amount e increases, the cylinder inner diameter Dc is decreased and thus Hc/Dc is increased. However, parameter A can be decreased.

In the calculation example (Hc small), the cylinder height Hc is set to be low until the cross-sectional areas of the inlet holes 135S and 135T become about 80% of those in the related art. By the cylinder height Hc being set to be low, in a case of the same parameter A value, Hc/Dc can be decreased and the amount of refrigerant leakage can be reduced. In this case, although since the cross-sectional areas of the inlet holes 135S and 135T are decreased, the pressure loss of the intake refrigerant is increased, since the refrigerant R32 has a lower density than the refrigerant R410A, the influence of pressure loss is decreased.

In the rotary compressor of the related art using the refrigerant R410A, since decrease in the Hc/Dc is effective for improving the compression efficiency, as a result of selecting the sizes of the compressing units 12S and 12T with a small Hc/Dc, the sizes of the compressing units 12S and 12T are not set so that parameter A is decreased. In the rotary compressor 1 using the refrigerant R32 which is greatly affected by the refrigerant heating, compression efficiency can be further improved than the rotary compressor of the related art by setting parameter A to a value smaller than the lower limit value 4.1 (see FIG. 3) of the rotary compressor of the related art.

FIG. 4 is a diagram illustrating relationship between parameter A and the sub-shaft unit (151) surface pressure. The sizes of the compressing units 12S and 12T with small parameter A are increased in the eccentric amount e of the eccentric portions (152S and 152T). When the eccentric amount e increases, it is necessary to decrease the diameter of the sub-shaft unit 151 for the convenience of assembling the rotation shaft 15 and the annular pistons 125S and 125T and when the sub-shaft diameter is decreased, the sub-shaft surface pressure P is increased. Therefore, parameter A has a lower limit value.

Next, a calculation method of the sub-shaft surface pressure P will be described. The axial load F [N] is expressed by the following expression (9).

$$F = W/(2\pi \cdot e \cdot N). \tag{9}$$

where,

W: compression power [W]

e: eccentric amount of the eccentric portion (152S and 152T) [mm]

N. rotation speed of the rotation shaft 15 [rev/s]

In addition, the compression power W is expressed by the following expression (10).

$$W = \Delta h \cdot V \cdot \rho \cdot N \tag{10}$$

where,

Δh: difference between discharge enthalpy and inlet enthalpy [J/g]

V: exclusion capacity (cylinder chamber capacity) [cc/rev]

ρ: intake refrigerant density [g/mm³]

N: rotation speed of the rotation shaft 15 [rev/s]

Δh, ρ, N are determined by operating conditions.

The shaft load F [mm²/rev] is set to the following expression (11) by leaving only the parameters related to the sizes of the compressing units 12S and 12T.

$$F = V/e \tag{11}$$

In addition, the area of the sub-shaft unit 151 is assumed to be the square of the diameter Ds of the sub-shaft unit 151.

From the above, the sub-shaft surface pressure P is calculated by the following expression (12).

$$P = V/(e \cdot Ds^2) \tag{12}$$

where,

V: exclusion capacity (cylinder chamber capacity) [cc/rev]

e: eccentric amount of the eccentric portion (152S and 152T) [mm]

Ds: diameter [mm] of sub-shaft unit 151

According to the experience value in the related art, the allowable maximum surface pressure of the sub-shaft unit 151 is 22 to 23. As illustrated in FIG. 4, in the calculation example (Hc small), the sub-shaft surface pressure P can be made smaller than in the calculation example (Hc large). In the calculation example (Hc small) in which parameter A an be decreased, the point at which the sub-shaft surface pressure P becomes 22 is a measure of the lower limit value of parameter A. As will be described below, by taking means to improve the durability of the sub-shaft unit 151, parameter A can be further decreased.

From the above, it is desirable that the range of parameter A is 3.9<parameter A<4.1 as illustrated in FIG. 4. In addition, in a case where adopting the cylinder height Hc (trial calculation example (Hc large)) which can ensure the cross-sectional area of the inlet holes 135S and 135T as in the related art, it is desirable that the range of parameter A is 4.0<Parameter A<4.1, as illustrated in FIG. 4.

Next, as a parameter simpler than parameter A, parameter B [dimensionless] is defined by the following expression (13).

$$B = e/V^{1/3} \tag{13}$$

where,

V: exclusion capacity (cylinder chamber capacity) [cc/rev]

e: eccentric amount of the eccentric portion (152S and 152T) [mm]

FIG. 5 is a diagram illustrating relationship between parameter A and parameter B. As illustrated in FIG. 5, parameter. A and parameter B have a correlation between each other. As a range corresponding to a range 3.9<parameter A<4.1 of parameter A, the range of parameter B may be set to the range of 0.215<parameter B<0.240.

FIG. 6 is a table illustrating Embodiments 1 to 3 of the sizes of the compressing units 12S and 12T of the two-cylinder type of rotary compressor 1 using the refrigerant R32. In Embodiments 1 to 3, the exclusion capacity V is 14.5 [mm³/rev], and the inner diameter of the compressor housing 10 is fixed at φ112 mm.

As illustrated in FIG. 6, in Embodiment 1, parameter A is the smallest among the three embodiments, and the influence of the refrigerant heating can be minimized. However, the sub-shaft surface pressure P is high. Although the sub-shaft surface pressure P of Example 1 does not exceed the allowable maximum surface pressure 23 of actual results of the related art, one of the following countermeasures may be taken.

a. An extreme pressure additive is added to lubricant oil.

b. The refrigerant melt viscosity of the lubricant oil is increased.

b₁. Viscosity grade is further increased than conventional viscosity grade (ISO VG68)

b₂. lubricant oil for refrigerant R410A which is not compatible with refrigerant R32 is used.

b₃. A mixture of lubricant oil for refrigerant R32 and lubricant oil for refrigerant R410A which are compatible with each other is used.

Here, the lubricant oil which is not compatible with the refrigerant means a lubricant oil having a region in which the refrigerant and the lubricant oil are separated into two layers irrespective of the temperature in a certain ratio range among ranges in which the ratio of the lubricant oil to the refrigerant is 0 to 100%.

In Embodiment 2, although parameter A is increased than that in Example 1, the sub-shaft surface pressure P is the smallest among the three embodiments. Therefore, it is suitable for a rotary compressor (for tropical area or for hot water heater) with a wide operating range. In addition, reliability can be maintained without adding an extreme pressure additive to the lubricant oil.

In Embodiment 3, parameter A has an intermediate value between Embodiment 1 and Example 2. Since the cylinder height Hc is higher than in Embodiment 1 and Embodiment 2, the cross-sectional areas of the inlet holes 135S and 135T can be increased, the pressure loss of the intake refrigerant can be reduced, and compression efficiency at high speed rotation is excellent. The sub-shaft surface pressure P is within the range of the sub-shaft surface pressure P of the rotary compressor of the related art, and reliability can be maintained without adding an extreme pressure additive to the lubricant oil. Since the rotary compressor 1 of Embodiment 3 can secure the cross-sectional area of the inlet holes 135S and 135T similar to the rotary compressor using the refrigerant R410l, the rotary compressor 1 of Embodiment 3 can be used for both the refrigerant R32 and the refrigerant R410A.

Example 2

FIG. 7 is a diagram illustrating relationship between parameter B and the surface pressure of the sub-shaft unit (151) As illustrated in FIG. 7, even in the same parameter B value, the sub-shaft surface pressure P can be decreased by the cylinder height Hc being decreased than by the cylinder height Hc being increased, there is a margin for reliability, and parameter B value can be further increased. As described above, the refrigerant heating is suppressed by the cylinder height Hc being decreased, and thus it is effective for improving the compression efficiency of the rotary compressor using the refrigerant R32.

However, in the related art, since the rotary compressor using the refrigerant R32 and the rotary compressor using the refrigerant R410A can obtain the substantially same refrigerating capacity by the same exclusion capacity (cylinder chamber capacity), components thereof are shared by the same compressing unit size being adopted, and thus it is not the compressing unit size which is particularly effective for refrigerant R32 only.

As described above, the intake refrigerant density of the refrigerant R32 is about 70% of that of the refrigerant. R41A. Therefore, in the case of using the refrigerant R32, even if the cross-sectional areas (inlet path area) of the inlet holes 135S and 135T the cylinders 121S and 121T are made smaller than those for the refrigerant R410A, the pressure loss of the intake refrigerant is not increased.

The inlet holes 135S and 135T are provided on the side portions of the cylinders 121S and 121T, and in the cylinder height Hc, a height to which the inlet pipes 104 and 105 are attached is secured. Since the wall thicknesses of the inlet, holes 135S and 135T are required to secure the wall thickness to secure 2 to 4 mm or more for the strength thereof, the cylinder height Hc is required to satisfy the following expression (14).

$$\text{cylinder height } Hc \geq \text{inlet hole diameter } Dk + 2 \times (2 \text{ to } 4) \quad (14)$$

According to expression (14), the cylinder height Hc can be decreased by decreasing the inlet hole diameter Dk.

In JP-A-2010-121481, a configuration in which cross-sectional shapes of the inlet holes 135S and 135T are long holes which are long in the circumferential direction is disclosed as a technique in which, even when the cylinder height Hc is decreased, the inlet path area can be secured and the intake pressure loss of the refrigerant is reduced. However, when the cross-sectional shapes of the inlet holes 135S and 135T are long holes, the cross-sectional shapes of the inlet pipes 104 and 105 and the low-pressure communication tubes 31S and 31T connecting the accumulator 25 and the inlet holes 135S and 135T to each other are also required to be long holes.

Although the inlet holes 135S and 135T are sealed by press-fitting the inlet pipes 104 and 105, the long hole shape is difficult to form with high accuracy, the seal becomes insufficient, the high-pressure refrigerant in the compressor housing 10 leaks from the press-fitted seal portion, and thus the compression efficiency is decreased. Therefore, in the invention, the cross-sectional shapes of the inlet holes 135S and 135T are formed in a circular shape.

The pressure loss of the intake refrigerant is generally proportional to the density of the refrigerant and is proportional to square of the inlet flow rate. Since the inlet flow rate is obtained by dividing the exclusion capacity (cylinder chamber capacity) per one cylinder by the inlet path area (proportional to square of inlet hole diameter), the intake pressure loss is represented by parameter C of the following expression (15).

$$C = \beta \cdot V^2 / Dk^4 \quad (15)$$

where,
β: intake refrigerant density ratio (refrigerant R410A is referred to as 100 and refrigerant R32 is referred to as 70) [dimensionless]
V: exclusion capacity (cylinder chamber capacity) [cc/rev]
Dk: inlet hole diameter [mm]

FIG. 8 is a diagram illustrating relationship between the exclusion capacity V and the intake pressure loss C (parameter C) of the rotary compressor for refrigerant R410A. As illustrated, in FIG. 8, in the rotary compressor for refrigerant R410A, the exclusion capacity V and the inlet hole diameter Dk are set so as to suppress the intake pressure loss C to 2.0 or less. The intake pressure loss C is large when the exclusion capacity V is 60 cc or more. This is because a pipe with a small diameter is used for reason that the pipe diameter becomes too thick, there is no margin in the pressure resistance strength, the availability and assembly of the pipe are deteriorated or the like, if the inlet hole diameter Dk (inlet, pipe diameter, low-pressure communication tube diameter) corresponding to the large exclusion capacity V is set.

If parameter C is 1.5 or less, it can be said that the pressure loss is decreased. When parameter C is 1.0 or less, although the pressure loss is decreased, it cannot be said that the pressure loss is low despite having a margin to decrease the cylinder height Hc. If it is the rotary compressor for the refrigerant R32, in order to suppress the refrigerant heating, the cylinder height He should be decreased.

From the above, in the rotary compressor dedicated to the refrigerant R32, by setting parameter C representing the intake pressure loss within the range of 1.0 to 1.5, the compression efficiency can be improved. The cylinder height Hc [mm] needs to satisfy the following expression (16) when the inlet hole diameter is Dk [mm].

$$(Dk+4) \leq Hc \leq (Dk+8) \quad (16)$$

FIG. 9 is a table illustrating Embodiments 4 to 6 of the sizes of the compressing units 12S and 12T of the two-cylinder type of rotary compressor 1 using the refrigerant R32. In Embodiments 4 to 6, the exclusion capacity V was 14.5{cc/rev} and the inner diameter of the compressor housing 10 is fixed at φ112 mm.

As illustrated in FIG. 9, in Embodiments 4 and 5, in a case where the refrigerant R410A is used, parameter C indicating the intake pressure loss exceeds 1.5, and there is concern that the intake pressure loss will be increased. However, in a case where the refrigerant R32 is used, parameter C is within the range of 1.0 to 1.5, and the cylinder height Hc is decreased while the intake pressure loss is suppressed. Since the refrigerant heating and the intake pressure loss can be suppressed, a rotary compressor having high efficiency is obtained.

In Embodiment 6, it is assumed that the same compressing unit sizes are used for the refrigerant R410A and the refrigerant R32. Even in a case where the refrigerant R410A is used, parameter C indicating the intake pressure loss can be suppressed to 1.5 or less, and the intake pressure loss is decreased. However, in a case where the refrigerant R32 is used, parameter C is less than 1.0, and there is margin to decrease the cylinder height Hc.

Example 3

FIG. 5 is a diagram illustrating relationship between parameter A and parameter B. As illustrated in FIG. 5, parameter A and parameter B have a correlation between each other. As a range corresponding to a range 3.9<parameter A<4.1 of parameter A, the range of parameter B may be set to the range of 0.215<parameter B<0.240. By e and V being set such that the range of the value of parameter B exceeds 0.215, the ratio of the wall surface area of the cylinder chamber to the exclusion capacity V can be decreased, and decrease in the compression efficiency by heating of the intake refrigerant can be suppressed.

In order to increase parameter B, the eccentric amounts e of the eccentric portions 152S and 152T are required to be increased. However, as described above, when the eccentric amount e is increased, there is a problem that the annular pistons 125S and 125T cannot be assembled to the eccentric portions 152S and 152T. Therefore, even if the diameter of the sub-shaft unit 151 is made smaller than the diameter of the main shaft unit 153 and the eccentric amount e is large, the annular pistons 125S and 125T can be assembled to the eccentric portions 152S and 152T.

FIG. 7 is a diagram illustrating relationship between parameter B and the sub-shaft surface pressure. As illustrated in FIG. 7, when the diameter of the sub-shaft unit 151 is decreased, the sub-shaft surface pressure P is increased, and the margin of reliability is decreased. Therefore, according to the experience value in the related art, since the allowable maximum surface pressure of the sub-shaft unit 151 is 22 to 23, the upper limit value of parameter B is set to 0.240 or less in order to suppress the sub-shaft surface pressure P to about 22 to 23.

In addition, to improve reliability, one of the following countermeasures may be taken.
 a. An extreme pressure additive is added to lubricant oil.
 b. The refrigerant melt viscosity of the lubricant oil is increased.
  $b_1$. Viscosity grade is further increased than conventional viscosity grade (ISO VG68)
  $b_2$. A lubricant oil for refrigerant R410A which is not compatible with refrigerant R32 is used (since the refrigerant R410A is not compatible with the refrigerant R32, the decrease in viscosity due to the refrigerant dissolving into the lubricant oil is decreased).
  $b_3$. A mixture of lubricant oil for refrigerant R32 and lubricant oil for refrigerant R410A which are compatible with each other is used.

Here, the lubricant oil which is not compatible with the refrigerant means a lubricant oil having a region in which the refrigerant and the lubricant oil are separated into two layers irrespective of the temperature in a certain range among ranges in which the ratio of the lubricant oil to the refrigerant is to 100%.

Example 4

FIG. 10 is a longitudinal sectional view illustrating another example of the rotary compressor according to the invention, FIG. 11-1 is a bottom view illustrating a first compressing unit of another example, FIG. 11-2 is a top view illustrating a second compressing unit of another example, FIG. 12 is a top view illustrating a compressing unit of another example, FIG. 13 is a longitudinal sectional view taken along the line A-A of FIG. 12, FIG. 14 is a top view illustrating an upper end plate of another example, FIG. 15 is a bottom view illustrating a compressing unit of another example, FIG. 16 is a bottom view illustrating a lower end plate of another example, and FIG. 17 is an exploded perspective view illustrating a lower end plate and a lower end plate cover of another example.

As illustrated in FIG. 10, the rotary compressor 1 includes the compressing unit 12 which is disposed in a lower portion of the sealed vertically-placed cylindrical compressor housing 10 and the motor 11 which is disposed in an upper portion of the compressor housing 10 and drives the compressing unit 12 via the rotation shaft 15.

The stator 111 of the motor 11 is formed in a cylindrical shape and is fixed by shrinkage fitting to an inner circumferential surface of the compressor housing 10. The rotor 112 of the motor 11 is disposed in an inside portion of the cylindrical stator 111 and is fixed by shrinkage fitting to the rotation shaft 15 which mechanically connects the motor 11 and the compressing unit 12 to each other.

The compressing unit 12 includes the first compressing unit 12S and the second compressing unit 12T, and the second compressing unit 12T is disposed above the first compressing unit 12S. As illustrated in FIG. 11-1, the first compressing unit 12S includes the annular first cylinder 121S. The first cylinder 121S includes the first side-flared portion 122S extending from an annular outer circumference thereof, and the first inlet hole 135S and the first vane groove 128S are radially provided in the first side-flared portion 122S, In addition, as illustrated in FIG. 11-2, the second compressing unit 12T includes the annular second cylinder 121T. The second cylinder 121T includes the second side-flared portion 122T extending from an annular outer circumference thereof and the second inlet hole 135T and the second vane groove 128T are radially provided in the second side-flared portion 122T.

As illustrated in FIG. 11-1, the first cylinder 121S is formed with the circular first cylinder inner wall 123S concentrically with the rotation shaft 15 of the motor 11. The first annular piston 125S having an outer diameter smaller than an inner diameter of the first cylinder 121S is disposed in the first cylinder inner wall 123S and the first cylinder chamber 130S which sucks, compresses and discharges a refrigerant is formed between the first cylinder inner wall 123S and the first annular piston 125S. As illustrated in FIG. 11-2, the circular second cylinder inner wall 123T is formed concentrically with the rotation shaft 15 of the motor 11 in the second cylinder 121T. The second annular piston 125T having an outer diameter smaller than an inner diameter of the second cylinder 121T is disposed in the second cylinder inner wall 123T and the second cylinder chamber 130T which sucks, compresses and discharges a refrigerant is formed between the second cylinder inner wall 123T and the second annular piston 125T.

The first vane groove 128S extending in the radial direction from the first cylinder inner wall 123S over the entire cylinder height is formed in the first cylinder 121S and the flat plate-shaped first vane 127S is slidably fitted into the first vane groove 128S. The second vane groove 128T extending in the radial direction from the second cylinder inner wall 123T over the entire cylinder height is formed in the second cylinder 121T and the plate-shaped second vane 127T is slidably fitted into the second vane groove 128T.

As illustrated in FIG. 11-1, the first spring hole 124S is formed on an outer side of the first vane groove 128S in the radial direction so as to communicate with to the first vane groove 128S from an outer circumferential portion of the first side-flared portion 122S. A first vane spring 126S which presses the back surface of the first vane 127S is inserted into the first spring hole 124S. As illustrated in FIG. 11-2, the second spring hole 124T is formed on an outer side of the second vane groove 128T in the radial direction so as to communicate with the second vane groove 128T from an outer circumferential portion of the second side-flared portion 122T. A second vane spring 126T which presses the back surface of the second vane 127T is inserted into the second spring hole 124T.

When the rotary compressor 1 is started up, the first vane 127S protrudes from an inside of the first vane groove 128S into an inside of the first cylinder chamber 130S by repulsive force of the first vane spring 126S, a tip thereof is in contact with the outer circumferential surface of the first annular piston 125S, and the first vane 127S divides the first cylinder chamber 130S into the first inlet chamber 131S and the first compression chamber 133S. In addition, the second vane 127T protrudes from an inside of the second vane groove 128T into an inside of the second cylinder chamber 130T by the repulsive force of the second vane spring 126T, the tip thereof is in contact with the outer circumferential surface of the second annular piston 125T, and the second vane 127T divides the second cylinder chamber 130l into the second inlet chamber 131T and the second compression chamber 133T.

In addition, the first pressure guiding-in path 129S which communicates an outside of the first vane groove 128S in the radial direction and an inside of the compressor housing 10 with each other, in which the compressed refrigerant in the compressor housing 10 is introduced, and which applies a back pressure to the first vane 127S by the pressure of the refrigerant is formed in the first cylinder 121S. The compressed refrigerant in the compressor housing 10 is also introduced from the first spring hole 124S. In addition, the second pressure guiding-in path 129T which communicates an outside of the second vane groove 128T in the radial direction and an inside of the compressor housing 10 with each other, in which the compressed refrigerant in the compressor housing 10 is introduced, and which applies a back pressure to the second vane 127T by the pressure of the refrigerant is formed in the second cylinder 121T. The compressed refrigerant in the compressor housing 10 is also introduced from the second spring hole 124T.

The first inlet hole 135S which communicates the first inlet chamber 131S and the outside portion with each other is provided in the first side-flared portion 122S of the first cylinder 121S so as to suck a refrigerant from the outside portion into the first inlet chamber 131S. The second inlet hole 135T which communicates the second inlet chamber 121T and the outside portion with each other is provided in the second side-flared portion 122T of the second cylinder 121T so as to suck a refrigerant from the outside portion into the second inlet chamber 131T.

In addition, as illustrated in FIG. 10, the intermediate partition plate 140 is disposed between the first cylinder 121S and the second cylinder 121T and partitions into the first cylinder chamber 130S (see FIG. 11-1) of the first cylinder 121S and the second cylinder chamber 130T (see FIG. 11-2) of the second cylinder 121T. The intermediate partition plate 140 closes an upper end portion of the first cylinder 121S and a lower end portion of the second cylinder 121T.

The lower end plate 160S is disposed at the lower end portion of the first cylinder 121S and closes the first cylinder chamber 130S of the first cylinder 121S. In addition, the upper end plate 160T is disposed at the upper end portion of the second cylinder 121T and closes the second cylinder chamber 130T of the second cylinder 121T. The lower end plate 160S closes the lower end portion of the first cylinder 121S and the upper end plate 160T closes the upper end portion of the second cylinder 121T.

The sub-bearing unit 161S is formed on the lower end plate 160S and the sub-shaft unit 151 of the rotation shaft 15 is rotatably supported by the sub-bearing unit 161S. The main bearing unit 161T is formed on the upper end plate 160T and the main shaft unit 153 of the rotation shaft 15 is rotatably supported by the main bearing unit 161T.

The rotation shaft 15 includes the first eccentric portion 152S and the second eccentric portion 152T which are eccentrically shifted by 180° phase from each other, the first eccentric portion 152S is rotatably fitted to the first annular piston 125S of the first compressing unit 12S, and the second eccentric portion 152T is rotatably fitted to the second annular piston 125T of the second compressing unit 12T.

When the rotation shaft 15 rotates, the first annular piston 125S revolves clockwise in FIG. 11-1 along the first cylinder inner wall 123S in the first cylinder 121S and the first vane 127S reciprocates following the revolution of the first annular piston 125S. Due to the movement of the first annular piston 125S and the first vane 127S, the capacities of the first inlet chamber 131S and the first compression chamber 133S are continuously changed, and the compressing unit 12 continuously sucks, compresses and discharges a refrigerant. In addition, when the rotation shaft 15 rotates, the second annular piston 125T revolves counterclockwise in FIG. 11-2 along the second cylinder inner wall 123T in the second cylinder 121T and the second vane 127T reciprocates following the revolution of the second annular piston 125T. Due to the movement of the second annular piston 125T and the second vane 127T, the capacities of the second inlet chamber 131T and the second compression chamber 133T are continuously changed, and the compressing unit 12 continuously sucks, compresses and discharges a refrigerant.

As illustrated in FIG. 10, a communication portion 180S is formed under the lower end plate 160S by the flat plate-shaped lower end plate cover 170S being disposed and covering a concave portion 163S provided to the lower end plate 160S. The first compressing unit 12S opens into the communication portion 180S. In other words, in the vicinity of the first vane 127S of the lower end plate 160S, a first discharge hole 190S communicating the first compression chamber 133S of the first cylinder 121S and the communication portion 180S with each other is provided and the reed valve type of first discharge valve 200S for preventing back-flow of the compressed refrigerant is disposed in the first discharge hole 190S.

The communication portion 180S communicates a discharge side of the first compressing unit 12S and an inside of the upper muffler chamber 180T with each other through the refrigerant path hole 136 (see FIG. 10, FIGS. 11-1, and 11-2) which passes through the lower end plate 160S, the first cylinder 121S, the intermediate partition plate 140, the second cylinder 121T, and the upper end plate 160T. In addition, the tip portion of the first discharge valve cap 201S for limiting the flexural valve opening amount of the first discharge valve 200S, which overlaps the first discharge valve 200S, is accommodated in the concave portion 163S provided in the lower end plate 160S, together with the tip portion of the first discharge valve 200S. The first discharge hole 190S, the first discharge valve 200S, and the first discharge valve cap 201S constitute a first discharge valve unit of the lower end plate 160S.

As illustrated in FIG. 10 to FIG. 14, the upper end plate cover 170T having five bulging portions 171T is disposed above the upper end plate 160T and the upper muffler chamber 180T is formed between the upper end plate 160T and the upper end plate cover 170T. The upper muffler chamber 180T communicates with the inside portion of the compressor housing 10 by an annular muffler discharge hole 172T formed between the main bearing unit 161T of the upper end plate 160T and the upper end plate cover 170T, and the compressed refrigerant in the upper muffler chamber 180T is discharged from the muffler discharge hole 172T into the compressor housing 10. In the vicinity of the second vane 127T of the upper end plate 160T, a second discharge hole 190T communicating the second compression chamber 133T of the second cylinder 121T and the upper muffler chamber 180T with each other is provided and a reed valve type of second discharge valve 200T for preventing back-flow of the compressed refrigerant is disposed in the second discharge hole 190T.

In addition, the tip portion of the second discharge valve cap 201T for limiting the flexural valve opening amount of the second discharge valve 200T, which overlaps the second discharge valve 200T, is accommodated in the concave portion 163T provided in the upper end plate 160T, together with the tip portion of the second discharge valve 200T. The upper muffler chamber 180T reduces pressure pulsation of the discharged refrigerant. The second discharge hole 190T, the second discharge valve 200T, and the second discharge valve cap 201T constitute a second discharge valve unit of the upper end plate 160T.

As illustrated in FIG. 12 to FIG. 15, the lower end plate cover 170S, the lower end plate 160S, the first cylinder 121S, the intermediate partition plate 140, the second cylinder 121T, the upper end plate 160T, and the upper end plate cover 170T are integrally fastened by a plurality of bolts in a manner which will be described below and thus become the compressing unit 12. An outer circumferential portion of the upper end plate 160T of the compressing unit 12 fastened integrally is fixed to the compressor housing 10 by spot welding, and thus the compressing unit 12 is fixed to the compressor housing 10.

The first through hole 101 and the second through hole 102 are spaced apart from each other in the axial direction and sequentially provided on the outer circumferential wall of the cylindrical compressor housing 10 from the lower portion thereof such that the first inlet pipe 104 and the second inlet pipe 105 pass through the holes. In addition, the accumulator 25 formed of an independent cylindrical sealed container is held by the accumulator holder 252 and the accumulator band 253 on an outside portion of the compressor housing 10.

The system connecting pipe 255 which is connected to an evaporator of a refrigerant circuit (refrigeration cycle) is connected to a center of a top portion of the accumulator 25 and the first low-pressure communication tube 31S and the second low-pressure communication tube 31T of which one end extends to an upper side of an inside portion of the accumulator 25 and of which the other end is connected to the other ends of the first inlet pipe 104 and the second inlet pipe 105 are fixed to the bottom through hole 257 provided to a bottom portion of the accumulator 25.

The first low-pressure communication tube 31S which guides the low-pressure refrigerant of the refrigerant circuit to the first compressing unit 12S via the accumulator 25 is connected to the first inlet hole 135S (See FIG. 11-1) of the first cylinder 121S via the first inlet pipe 104 as the inlet portion. In other words, the first inlet hole 135S is connected to the evaporator of the refrigerant (refrigeration cycle). The second low-pressure communication tube 31T which guides the low-pressure refrigerant of the refrigerant circuit to the second compressing unit 12T via the accumulator 25 is connected to the second inlet hole 135T (See FIG. 11-2) of the second cylinder 121T via the second inlet pipe 105 as the inlet portion. In other words, the second inlet hole 135T is connected to the evaporator of the refrigerant circuit (refrigeration cycle).

The discharge pipe 107 as a discharge portion, which is connected to the refrigerant circuit (refrigeration cycle) and discharges a high-pressure refrigerant to a condenser side of the refrigerant circuit, is connected to a top portion of the compressor housing 10. In other words, the first discharge hole 190S and the second discharge hole 190T are connected to the condenser of the refrigerant circuit (refrigeration cycle).

Lubricant oil is enclosed to approximately the height of the second cylinder 121T in the compressor housing 10. In addition, the lubricant oil is sucked up from the oil feeding pipe 16 attached to the lower end portion of the rotation shaft 15 by a pump impeller (not illustrated) inserted into a lower portion of the rotation shaft 15, circulates through the compressing unit 12, lubrication of the sliding component (first annular piston 125S and second annular piston 125T) is performed and minute gaps of the compressing unit 12 are sealed.

As illustrated in FIG. 11-1 to FIG. 15, the lower end plate cover 170S, the lower end plate 160S, the first cylinder 121S, the intermediate partition plate 140, the upper end plate 160T, and the upper end plate cover 170T are provided with five (a plurality of) bolt through holes 137 at the same phase position on a substantially concentric circle, respectively. Five screw holes 138 are provided at the same phase position on the substantially concentric circle with the five bolt through holes 137 in the second cylinder 121T. The bolt through hole 137 and the screw hole 138 are collectively referred to as bolt holes (137 and 138). The bolt hole is a through hole. Although the five (a plurality of) bolt holes may be disposed at regular intervals (equal phase angle=72°), the bolt holes may be disposed at unequal intervals with slightly shifted spacing to avoid wrong assembly. Five penetrating bolts 174 are inserted into the bolt holes from the upper end plate cover 170T side, the five penetrating bolts 175 are inserted into the bolt holes from the lower end plate cover 170S side and thus the entire compressing unit 12 is fastened. The number of bolt holes is not limited to five, and may be four or six or more.

Two auxiliary bolt through holes 300 are provided in the lower end plate 160S, two auxiliary screw holes 301 are provided in the first cylinder 121S, two auxiliary bolts 176 are inserted into the auxiliary bolt through holes 300 and the auxiliary screw holes 301, and thus the lower end plate 160S and the first cylinder 121S are fastened to each other. The lower end plate 160S and the first cylinder 121S are fastened in advance before the entire compressing unit 12 is fastened.

As illustrated in FIG. 11-1, FIG. 11-2, FIG. 14 and FIG. 16, the refrigerant path hole 136 is provided in a range (in range of phase angle≈90° in Example 1) between the adjacent two bolt holes 137 which sandwich the vicinity of the first discharge hole 190S and the second discharge hole 190T, for example, the first discharge hole 190T, the second discharge hole 190S, the first vane 127S, and the second vane 127T. The number of the refrigerant path holes 136 is not limited to one, and two or three holes may be provided adjacent to each other.

The circular concave portion 163S is formed on the lower end plate 160S. The concave portion 163S accommodates the tip portion of the first discharge valve 200S and the tip portion of the first discharge valve cap 201S and constitutes the communication portion 180S which communicates the first discharge hole 190S and the lower end portion of the refrigerant path hole 136 with each other. A circular concave portion 163T is formed on the upper end plate 160T. The concave portion 163T accommodates the tip portion of the second discharge valve 200T and the tip portion of the second discharge valve cap 201T and constitutes a part of the upper muffler chamber 180T which communicates the second discharge hole 190T and the upper end portion of the refrigerant path hole 136 with each other.

In addition, a groove 164S is formed in the lower end plate 160S which attaches a base end portion of the first discharge valve 200S and a base end portion of the first discharge valve cap 201S by rivets. A groove 164T is formed in the upper end plate 160T which attaches a base end portion of the second discharge valve 200T and a base end portion of the second discharge valve cap 201T by rivets. On the lower surface of the first cylinder 121S and the upper surface of the second cylinder 121T, a recess 303 for accommodating the head of the rivet is formed. Since the first discharge valve 200S and the first discharge valve cap 201S are attached to fill the space, the groove 164S does not constitute the communicating portion 180S. Since the second discharge valve 200T and the second discharge valve cap 201T are attached to fill the space, the groove 164T does not constitute the upper muffler chamber 180T.

The lower end plate 160S is formed to be thick, and the concave portion 163S and the groove 164S are formed to a depth which can completely accommodate the first discharge valve 200S and the first discharge valve cap 201S.

In the rotary compressor 1 of another example, although the upper muffler chamber 180T is formed as a chamber having the five bulging portions 171T formed by press-molding the upper end plate cover 170T, the lower end plate cover 170S of another example is a plate shape having no irregularities covering the first discharge valve unit and the refrigerant path hole 136 of the lower end plate 160S, and the communication portion 180S is formed by only the circular concave portion 163S of the lower end plate 160S as a small capacity path smaller than the volume of the upper muffler chamber 180T in order to communicate the first discharge hole 190S and the refrigerant path hole 135 with each other.

In the rotary compressor 1 of another example, since the communicating portion 180S is a path having a small capacity smaller than the volume of the upper muffler chamber 180T by only the concave portion 163S of the lower end plate 160S, the space into which the refrigerant compressed by the second cylinder 121T flows by flowing through the refrigerant path hole 136 in a reverse direction is decreased, and the back-flow is suppressed and thus decrease in efficiency of the rotary compressor 1 can be prevented. The lower end plate cover 170S may be press molded in the same manner as the upper end plate cover 170T to form the bulging portions and thus forms a lower muffler chamber.

Next, with reference to FIG. 10 to FIG. 17, the characteristic configuration of the rotary compressor 1 of the example using the refrigerant R32 will be described, which overlaps with the description in Example 1. The temperature increase Δt [K] of the intake refrigerant in the first cylinder chamber 130S and the second cylinder chamber 130T is expressed by the following expression (1).

$$\Delta t = h \cdot S \cdot \Delta \theta / (m \cdot c) \quad (1)$$

where, h: heat transfer coefficient [W/(mm²·K)]
S: wall surface area of cylinder chamber (130S and 130T) [mm²]
Δθ: difference between wall surface temperature and refrigerant temperature [K]
m: refrigerant mass [g/s]=(cylinder chamber capacity V [mm³/rev])×(intake refrigerant density ρ [g/mm³])
c: refrigerant specific heat [J/(g·K)]

The intake refrigerant density ρ of the refrigerant R32 is about 70% of the refrigerant R410A and the evaporation enthalpy is about 140%. Therefore, substantially the same exclusion capacity V (cylinder chamber capacity) can be applied. Since the exclusion capacities V are equal to each other, the size of the compressing unit 12 for the refrigerant R410A can be used and the wall surface areas S are also the same. Therefore, Δt in the above expression (1) is increased for the refrigerant R32 having a smaller intake refrigerant density ρ than for the refrigerant R410A and the refrigerant R32 is likely to be heated compared to the refrigerant R410A. From this, in a case where the refrigerant R32 is adopted, suppression of refrigerant heating is effective for improving compression efficiency compared to a case where the refrigerant R410A is used.

In the invention, when the wall surface area of the cylinder chamber (130S and 130T) is referred to as S and the exclusion capacity (cylinder chamber capacity) is referred to as V, the refrigerant heating is suppressed by the sizes of the compressing units 12S and 12T being set so that S/V is decreased.

The wall surface area S of one cylinder chamber (first cylinder chamber 130S or second cylinder chamber 130T) of the rotary compressor 1 of another example is expressed by the following expressions (2) to (5).

$$S=2Sb+Sc+Sr \tag{2}$$

$$Sb=(Dc^2-(D-2e)^2)\pi/4 \tag{3}$$

$$Sc=\pi \cdot Dc \cdot Hc \tag{4}$$

$$Sr=\pi \cdot (Dc-2e) \cdot Hc \tag{5}$$

where,
Sb: area of the end plate (160S and 160T) portion or the intermediate partition plate (140) portion of the cylinder chamber [mm$^2$]
Sc: cylinder (121S and 121T) inner circumferential wall area [mm$^2$]
Sr: annular piston (125S and 125T) outer circumferential wall area [mm$^2$]
Dc: cylinder (121S and 121T) inner diameter [mm]
e: eccentric portion (152S and 152T) Eccentric amount [mm]
Hc: cylinder (121S and 121T) height [mm]

In addition, the exclusion capacity (cylinder chamber capacity) V [cc/rev] of one cylinder chamber (first cylinder chamber 130S or second cylinder chamber 130T) of the rotary compressor 1 is expressed by the following expression (6).

$$V=\pi \cdot e \cdot (Dc-e) \cdot Hc \tag{6}$$

From expressions (2) and (6), S/V is expressed by the following expression (7).

$$S/V=2(e+HC)/(e \cdot HC) \tag{7}$$

Since as the exclusion capacity V is increased, S/V is decreased, in order to evaluate the size of the cylinder chamber, it is necessary to eliminate the influence of the exclusion capacity V. Therefore, let S/V multiplied by $V^{1/3}$ be referred to as parameter A [dimensionless]. Parameter A is expressed by the following expression (8), and as parameter A is decreased, the influence of the refrigerant heating is decreased.

$$A=(e+Hc) \cdot (Dc-e)^{1/3}/(e \cdot Hc) \tag{8}$$

Next, in Japanese Patent No. 4864572, it is described that the compression efficiency is improved by reducing the refrigerant leak amount by decreasing the ratio Hc/Dc of the cylinder height Hc and the cylinder inner diameter Dc.

FIG. 3 is a diagram illustrating relationship between parameter A and Hc/Dc. As illustrated in FIG. 3, as parameter A is decreased, Hc/Dc tends to be increased. In Embodiments 1 to 3 illustrated in FIG. 3, the exclusion capacity V, the inner diameter of the compressor housing 10 and the cylinder Height Hc of the rotary compressor 1 are the same, and the eccentric portion eccentric amount e is changed. Calculation is made for two patterns with cylinder height Hc large and cylinder height Hc small.

In the calculation example (Hc large), the cross-sectional areas of the inlet holes 135S and 135T are set to the cylinder height Hc which can be commonly secured in the related art. As the eccentric portion eccentric amount e increases, the cylinder inner diameter Dc is decreased and thus Hc/Dc is increased. However, parameter A can be decreased.

In the calculation example (Hc small), the cylinder height Hc is set to be low until the cross-sectional areas of the inlet holes 135S and 135T become about 80% of those in the related art. By the cylinder height Hc being set to be low, Hc/Dc can be decreased and the amount of refrigerant leakage can be reduced in a case of the same parameter A value. In this case, although since the cross-sectional areas of the inlet holes 135S and 135T are decreased, the pressure loss of the intake refrigerant is increased, since the refrigerant R32 has a lower density than the refrigerant R410A, the influence of pressure loss is decreased.

In the rotary compressor of the related art using the refrigerant R410A, since decrease in the Hc/Dc is effective for improving the compression efficiency, as a result of selecting the sizes of the compressing units 12S and 12T with a small Hc/Dc, the sizes of the compressing units 12S and 12T are not set so that parameter A is decreased. In the rotary compressor 1 using the refrigerant R32 which is greatly affected by the refrigerant heating, compression efficiency can be further improved than the rotary compressor of the related art by setting parameter A to a value smaller than the lower limit value 4.1 (see FIG. 3) of the rotary compressor of the related art.

FIG. 4 is a diagram illustrating relationship between parameter A and the sub-shaft unit (151) surface pressure. The sizes of the compressing units 12S and 12T with small parameter A are increased in the eccentric amount e of the eccentric portions (152S and 152T). When the eccentric amount e increases, it is necessary to decrease the diameter of the sub-shaft unit 151 for the convenience of assembling the rotation shaft 15 and the annular pistons 125S and 125T and when the sub-shaft diameter is decreased, the sub-shaft surface pressure P is increased. Therefore, parameter A has a lower limit value.

Next, a calculation method of the sub-shaft surface pressure P will be described. The axial load F [N] is expressed by the following expression (9).

$$F=W/(2\pi \cdot e \cdot N) \tag{9}$$

where,
W: compression power [W]
e: eccentric amount of the eccentric portion (152S and 152T) [mm]
N: rotation speed of the rotation shaft 15 [rev s]

In addition, the compression power W is expressed by the expression (10).

$$W=\Delta h \cdot V \cdot \rho \cdot N \tag{10}$$

where,
Δh: difference between discharge enthalpy and inlet enthalpy [j/g]
V: exclusion capacity (cylinder chamber capacity) [cc/rev]
ρ: intake refrigerant density [g/mm$^3$]
N: rotation speed of the rotation shaft 15 [rev/s]
Δh, ρ, N are determined by operating conditions.

The shaft load F [mm$^2$/rev] is set to the following expression (11) by leaving only the parameters related to the sizes of the compressing units 12S and 12T.

$$F=V/e \tag{11}$$

In addition, the area of the sub-shaft unit 151 is assumed to be the square of the diameter Ds of the sub-shaft unit 151.

From the above, the sub-shaft surface pressure P is calculated by the following expression (12).

$$P=V/(e \cdot Ds^2) \tag{12}$$

where,
V: exclusion capacity (cylinder chamber capacity) [cc/rev]
e: eccentric amount of the eccentric portion (152S and 132T) [mm]
Ds: diameter [mm] of sub-shaft unit 151

According to the experience value in the related art, the allowable maximum surface pressure of the sub-shaft unit 151 is 22 to 23. As illustrated in FIG. 4, in the calculation example (Hc small), the sub-shaft surface pressure P can be made smaller than the calculation example (Hc large). In the calculation example (Hc small) in which parameter A can be decreased, the point at which the sub-shaft surface pressure P becomes 22 is a measure of the lower limit value of parameter A. By taking means to improve the durability of the sub-shaft unit 151, parameter A can be further decreased.

From the above, it is desirable that the range of parameter A is 3.9<parameter A<4.1 as illustrated in FIG. 4. In addition, in a case where adopting the cylinder height Hc (trial calculation example (Hc large)) which can ensure the cross-sectional area of the inlet holes 135S and 135T as in the related art, it is desirable that the range of parameter A is 4.0<Parameter A<4.1, as illustrated in FIG. 4.

Next, as a parameter simpler than parameter A, parameter B [dimensionless] is defined by the following expression (13).

$$B = e/V^{1/3} \quad (13)$$

where,

V: exclusion capacity (cylinder chamber capacity) [cc/rev]

e: eccentric amount of the eccentric portion (152S and 152T) [non]

FIG. 5 is a diagram illustrating relationship between parameter A and parameter B. As illustrated in FIG. 5, parameter A and parameter B have a correlation between each other. As a range corresponding to a range 3.9<parameter A<4.1 of parameter A, the range of parameter B may be set to the range of 0.215<parameter B<0.240. The description described above overlaps with the description in Example 1.

Although overlapping with the description in Example 2, FIG. 7 is a diagram illustrating relationship between parameter B and the surface pressure of the sub-shaft unit (151). As illustrated in FIG. 7, even in the same parameter B value, the sub-shaft unit surface pressure P can be decreased by the cylinder height Hc being decreased than by Hc being increased, there is a margin for reliability, and parameter B value can be further increased. As described above, the refrigerant heating is suppressed by the cylinder height Hc being decreased, and thus it is effective for improving the compression efficiency of the rotary compressor using the refrigerant R32.

However, in the related art, since the rotary compressor using the refrigerant R32 and the rotary compressor using the refrigerant R410A can obtain the substantially same refrigerating capacity by the same exclusion capacity (cylinder chamber capacity), components thereof are shared by the same compressing unit size being adopted, and thus it is not the compressing unit size which is particularly effective for refrigerant R 32 only.

As described above, the intake refrigerant density of the refrigerant R32 is about 70% of that of the refrigerant R410A. Therefore, in the case of using the refrigerant R32, even if the cross-sectional areas (inlet path area) of the inlet holes 135S and 135T of the cylinders 121S and 121T are made smaller than that for the refrigerant R410A, the pressure loss of the intake refrigerant is not increased.

The inlet holes 135S and 135T are provided on the side portions of the cylinders 121S and 121T, and in the cylinder height Hc, a height to which the inlet pipes 104 and 105 are attached is secured. Since the wall thicknesses of the inlet holes 135S and 135T are required to secure the wall thickness to secure 2 to 4 mm or more for the strength thereof, the cylinder height Hc is required to satisfy the following expression (14).

$$\text{cylinder height } Hc \geq \text{inlet hole diameter } Dk + 2 \times (2 \text{ to } 4) \quad (14)$$

According to expression (14), the cylinder height Hc can be decreased by decreasing the inlet hole diameter Dk.

In JP-A-2010-121481, a configuration in which cross-sectional shape of the inlet holes 135S and 135T are long holes which are long in the circumferential direction is disclosed as a technique in which, even when the cylinder height Hc is decreased, the inlet path area can be secured and the intake pressure loss of the refrigerant is reduced. However, when the cross-sectional shapes of the inlet holes 135S and 135T are long holes, the cross-sectional shapes of the inlet pipes 104 and 105 and the low-pressure communication tubes 31S and 31T connecting the accumulator 25 and the inlet holes 135S and 135T to each other are also required to be long holes.

Although the inlet holes 135S and 135T are sealed by press-fitting the inlet pipes 104 and 105, the long hole shape is difficult to form with high accuracy, the seal becomes insufficient, the high-pressure refrigerant in the compressor housing 10 leaks from the press-fitted seal portion, and thus the compression efficiency is decreased. Therefore, in the invention, the cross-sectional shapes of the inlet holes 135S and 135T are formed in a circular shape.

The pressure loss of the intake refrigerant is generally proportional to the density of the refrigerant and is proportional to square of the inlet flow rate. Since the inlet flow rate is obtained by dividing the exclusion capacity (cylinder chamber capacity) per one cylinder by the inlet path area (proportional to square of inlet hole diameter), the intake pressure loss is represented by parameter C of the following expression (15).

$$C = \beta \cdot V^2 / Dk^4 \quad (15)$$

where,

β: intake refrigerant density ratio (refrigerant R410A is referred to as 100 and refrigerant R32 is referred to as 70) [dimensionless]

V: exclusion capacity (cylinder chamber capacity) [cc/rev]

Dk: inlet hole diameter [mm]

FIG. 8 is a diagram illustrating relationship between the exclusion capacity V and the intake pressure loss C (parameter C) of the rotary compressor for refrigerant R410A. As illustrated in FIG. 8, in the rotary compressor for refrigerant R410A, the exclusion capacity V and the inlet hole diameter Dk are set so as to suppress the intake pressure loss C to 2.0 or less. The intake pressure loss C is large when the exclusion capacity V is 60 cc or more. This is because a pipe with a small diameter is used for reason that the pipe diameter becomes too thick, there is no margin in the pressure resistance strength, the availability and assembly of the pipe are deteriorated or the like, if the inlet hole diameter Dk (inlet pipe diameter, low-pressure communication tube diameter) corresponding to the large exclusion capacity V is set.

If parameter C is 1.5 or less, it can be said that the pressure loss is decreased. When parameter C is 1.0 or less, although the pressure loss is decreased, it cannot be said that the pressure loss is low despite having a margin to decrease the cylinder height Hc. If it is the rotary compressor for the refrigerant R32, in order to suppress the refrigerant heating, the cylinder height Hc should be decreased. The description described above overlaps with the description in Example 2.

In an inverter type of air conditioner, the operating hours at low capacity (low load) is long, and efficiency at low capacity operation greatly affects annual efficiency. Therefore, even if the efficiency at the maximum capacity operation somewhat deteriorates, if the efficiency at the low capacity operation can be improved, the annual efficiency can be improved.

FIG. 18 is an enlarged view of portion B in FIG. 13. The range of the cylinder height Hc is set to the range illustrated in the following expression (16) regardless of the securing of the cross-sectional areas (inlet path area) of the inlet holes 135S and 135T of the cylinders 121S and 121T (see FIG. 18).

$$2\times(d+M)+1.0 \leq Hc \leq 2\times(d+M)+2.5 \quad (16)$$

where, d: nominal diameter of penetrating bolts 174 and 175 [mm]

M: chamfer size of screw hole 138 [mm]

Hc: cylinder height

By setting the range of the cylinder height Hc to the range illustrated in the expression (16), the diameters of the inlet holes 135S and 135T are decreased, and the efficiency at the maximum capacity operation may be decreased in some cases. However, since the efficiency at the low capacity operation is improved by decreasing the cylinder height Hc, the annual efficiency can be improved.

When the cylinder height Hc is decreased, the screwing lengths of the penetrating bolts 174 and 175 fixing the compressing unit 12 are decreased. If the screwing lengths of the penetrating bolts 174 and 175 are too decreased, the screw threads are collapsed by tightening and the necessary fastening force cannot be secured. By setting the cylinder height Hc to the range of above expression (16), screwing lengths of the same lengths as the nominal diameters of the penetrating bolts 174 and 175 can be secured, even if the penetrating bolts 174 and 175 are tightened until the required fastening force is obtained, the threads are not collapsed.

The chamfer size M of the screw hole 138 in the expression (16) considers the fact that the effective threaded length is decreased by the chamfer size M. In addition, in the expression (16), it is intended to set the gap between the tip of the penetrating bolt 174 and the tip of the penetrating bolt 175 to be in the range of 1.0 [mm] to 2.5 [mm]. The minimum value 1.0 [mm] of the gap is set by considering the length tolerance of the penetrating bolts 174 and 175 and the height tolerance of the fastening components (lower end plate cover 170S, lower end plate 160S, first cylinder 121S, intermediate partition plate 140, upper end plate 160T, and upper end plate Cover 170T).

For example, if the length tolerance of the penetrating bolts 174 and 175 is set to ±0.3 mm and the height tolerance of the fastening components is set to ±0.2 mm, the gap between the both bolt tips is decreased by 0.8 [mm] at the maximum tolerance. Further, the gap is also decreased due to the elastic deformation of the penetrating bolts 174 and 175 or permanent set-in fatigue of the seating surface. In order to prevent the contact between the both bolt tips, the minimum value of the gap is 1.0 [mm]. On the other hand, if the gap is too increased, since the cylinder height which can reduce refrigerant heating cannot be set, the maximum value of the gap is 2.5 [mm].

The rotary compressor 1 of another example has a structure in which the penetrating bolt 174 is tightened from the upper side and the penetrating bolt 175 is tightened from the lower side of the same screw hole 138 of the second cylinder 121T (see FIG. 13 and FIG. 18). This structure is advantageous in that the number of screw holes 138 to be machined is decreased compared to a case where screw holes 138 for fastening the penetrating bolts 174 and screw holes 138 for fastening the penetrating bolts 175 are separately provided and the structure can be manufactured at low cost. The second cylinder 121T provided with the screw hole 138 and the first cylinder 121S provided with the bolt through hole 137 may be made of cast iron (FC250 or the like) which can be manufactured at low cost. It is desirable that screw tip incomplete screw portion length (see FIG. 18) of the penetrating bolts 174 and 175 is equal to or less than 1 times the screw pitch.

FIG. 19 is a table illustrating Embodiments 7 to 9 of the sizes of the compressing units 12S and 12T of the two-cylinder type of rotary compressor 1 using the refrigerant R32. In Embodiments 7 to 9, the exclusion capacity V is fixed at 14.5 [cc/rev] and the inner diameter of the compressor housing 10 is fixed at ϕ112 mm.

The cylinder height Hc can be lowered to Hc=2×(d+M)+1.0, regardless of securing the cross-sectional area (inlet path area) of the inlet holes 135S and 135T of the cylinders 121S and 121T and in the case of Embodiments 7 and 8, the cylinder height Hc can be decreased to 12.0 [mm].

When the cylinder height Hc is set to be higher than 13.4 [mm] illustrated in Embodiment 9, parameters A and B are unlikely to put in the specified range, the influence of the refrigerant heating is increased and thus the efficiency is likely to be decreased. Therefore, the cylinder height may be Hc=2×(d+M)+2.5 or less. In the embodiment, the upper limit of the cylinder height Hc is 13.5 [mm].

In the invention, by appropriately setting the size of the compressing unit 12 without providing a hole or the like penetrating the cylinders 121S and 121T in the axial direction, heat transfer from the cylinders 121S and 121T and the end plates 160S and 160T to the refrigerant in the compressing unit 12 can be suppressed and increase in cost can be suppressed. In addition, the efficiency at the low capacity (low load) operation can be improved and the annual efficiency can be improved. The invention can be applied to a single cylinder system rotary compressor and a two-stage compression system rotary compressor.

As described above, although the examples are described, the examples are not limited by the contents described above. In addition, configuration elements described above include those easily assumed by those skilled in the art, substantially the same ones, and so-called equivalents. Further, the configuration elements described above can be appropriately combined with each other. Further, at least one of various omission, substitution, and change of the configuration elements can be performed without departing from the gist of the example.

REFERENCE SIGNS LIST

1: Rotary compressor
10: compressor housing
11: Motor
12: compressing unit
15: rotation shaft
16: oil feeding pipe
25: accumulator
31S: first low-pressure communication tube (low-pressure communication tube)
31T: second low-pressure communication tube (low-pressure communication tube)
101: first through hole (through hole)

102: second through hole (through hole)
104: first inlet pipe (inlet pipe)
105: second inlet pipe (inlet pipe)
107: discharge pipe (discharge portion)
111: stator
112: rotor
12S: first compressing unit (compressing unit)
12T: second compressing unit (compressing unit)
121S: first cylinder (cylinder)
121T: second cylinder (cylinder)
122S: first side-flared portion (side-flared portion)
122T: second side-flared portion (side-flared portion)
123S: first cylinder inner wall (cylinder inner wall)
123T: second cylinder inner wall (cylinder inner wall)
124S: first spring hole (spring hole)
124T: second spring hole (spring hole)
126S: first vane spring
126T: second vane spring
125S: first annular piston (annular piston)
125T: second annular piston (annular piston)
127S: first vane (vane)
127T: second vane (vane)
128S: first vane groove (vane groove)
128T: second vane groove (vane groove)
129S: first pressure guiding-in path (pressure guiding-in path)
129T: second pressure guiding-in path (pressure guiding-in path)
130S: first cylinder chamber (cylinder chamber)
130T: second cylinder chamber (cylinder chamber)
131S: first inlet chamber (inlet chamber)
131T: second inlet chamber (inlet chamber)
133S: first compression chamber (compression chamber)
133T: second compression chamber (compression chamber)
135S: first inlet hole (inlet hole)
135T: second inlet hole (inlet hole)
136: refrigerant path
137: bolt through hole (bolt hole)
138: screw hole (bolt hole)
140: intermediate partition plate
151: sub-shaft unit
152S: first eccentric portion (eccentric portion)
152T: second eccentric portion (eccentric portion)
153: main shaft unit
160S: lower end plate (end plate)
160T: upper end plate (end plate)
161S: sub-bearing unit (bearing portion)
161T: main bearing unit (bearing portion)
163S: concave portion
163T: concave portion
164S: groove
164T: groove
170S: lower end plate cover
170T: upper end plate cover
172T: muffler discharge hole
174: penetrating bolt
175: penetrating bolt
176: auxiliary bolt
180S: lower muffler chamber, communication portion
180T: upper muffler chamber
190S: first discharge hole (discharge valve unit)
190T: second discharge hole (discharge valve unit)
200S: first discharge valve (discharge valve unit)
200T: second discharge valve (discharge valve unit)
201S: first discharge valve cap (discharge valve unit)
201T: second discharge valve cap (discharge valve unit)
252: accumulator holder
253: accumulator band
255: system connecting pipe
257: bottom through hole
300: auxiliary bolt through hole
301: auxiliary screw hole
303: recess

The invention claimed is:

1. A rotary compressor, comprising:
a sealed longitudinal compressor housing which is provided with a discharge portion of a refrigerant at an upper portion thereof, is provided with an inlet portion of the refrigerant at a lower portion thereof, and in which lubricant oil is stored;
a compressing unit which is disposed in the compressor housing, compresses the refrigerant sucked from the inlet portion and discharges the refrigerant from the discharge portion;
a motor which is disposed in the compressor housing and drives the compressing unit;
a rotation shaft which is rotated by the motor; and
an accumulator which is attached to a side portion of the compressor housing and is connected to the inlet portion of the refrigerant,
wherein the rotation shaft includes an eccentric portion in which a piston of the compressing unit is fitted,
R32 is used as the refrigerant,
when an inner diameter of a cylinder constituting the compressing unit is referred to as $Dc$ [mm], a height of the cylinder is referred to as $He$ [mm], and an eccentric amount of the eccentric portion of the rotation shaft is referred to as $Dc$ [mm], $He$ [mm], and $e$ [mm] are set so that a value obtained by an expression $(e+Hc)-(Dc-e)^{1/3}/(e-Hc)^{2/3}$ is less than 4.1, and
when a cylinder chamber capacity of the cylinder is referred to as $V$ [cc/rev] and an inner diameter of an inlet hole of the cylinder is referred to as $Dk$ [mm], $V$ [cc/rev] and $Dk$ [mm] are set so that a value $[(cc/rev)^2/mm^4]$ obtained by an expression of $70V^2/Dk^4$ is 1.5 or less.

2. The rotary compressor according to claim 1,
wherein $V$ [cc/rev] and $Dk$ [mm] are set so that the value $[(cc/rev)^2/mm^4]$ obtained by the expression of $70V/Dk^4$ is 1.0 or more and 1.5 or less and $Dk$ [mm] and $Hc$ [mm] are set so that an expression $(Dk+4) \leq Hc \leq (Dk+8)$ is satisfied.

3. The rotary compressor according to claim 1,
wherein when the cylinder chamber capacity of the cylinder is referred to as $V$ [cc/rev] and an eccentric amount of an eccentric portion of the rotation shaft is referred to as $e$ [mm] and $V$ [cc/rev] are set so that the value obtained by an expression of $e/V^{1/3}$ is a value exceeding 0.215.

4. The rotary compressor according to claim 3,
wherein a diameter of a sub-shaft unit of the rotation shaft is further decreased than a diameter of a main shaft unit.

5. The rotary compressor according to claim 3,
wherein $e$ [mm] and $V$ [cc/rev] are set so that the value obtained by the expression of $e/V^{1/3}$ is less than 0.240.

6. The rotary compressor according to claim 3,
wherein when a nominal diameter of a penetrating bolt, which fastens an end plate that is a configuration component of the compressing unit to the cylinder that is a configuration component of the compressor unit, is referred to as $d$ [mm] and a chamfer size of a screw hole, which is provided to the cylinder and into which the penetrating bolt is fastened, is referred to as M [mm], the height Hc [mm] of the cylinder is set so that a relationship of $2\times(d+M)+1.0 \leq Hc \leq 2\times(d+M)+2.5$ is satisfied.

7. The rotary compressor according to claim 1, wherein the lubricant oil includes an extreme pressure additive is added to the lubricant oil.

8. The rotary compressor according to claim 1, wherein a viscosity grade of the lubricant oil is ISO VG68 or higher.

9. The rotary compressor according to claim 1, wherein a lubricant oil for refrigerant R410A which is not compatible with R32, is used as the lubricant oil.

10. The rotary compressor according to claim 1, wherein a mixture of a lubricant oil which is compatible with the refrigerant R32 and a lubricant oil for refrigerant R410A which is not compatible with refrigerant R 32, is used as the lubricant oil.

11. The rotary compressor according to claim 1, wherein when a nominal diameter of a penetrating bolt, which fastens an end plate that is a configuration component of the compressing unit to the cylinder, is referred to as d [mm] and a chamfer size of a screw hole, which is provided to the cylinder and into which the penetrating bolt is fastened, is referred to as M [mm], the height He [mm] of the cylinder is set so that relationship of $2\times(d+M)+1.0\ Hc \leq 2\times(d+M)+2.5$ is satisfied.

* * * * *